United States Patent
Allen et al.

(10) Patent No.: US 11,317,240 B2
(45) Date of Patent: *Apr. 26, 2022

(54) GEO-LOCATION BASED EVENT GALLERY

(71) Applicant: Snap Inc., Santa Monica, CA (US)

(72) Inventors: Nicholas Richard Allen, Venice, CA (US); Robert Cornelius Murphy, Venice, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,817

(22) Filed: Apr. 7, 2020

(65) Prior Publication Data

US 2020/0288270 A1 Sep. 10, 2020

Related U.S. Application Data

(63) Continuation of application No. 16/219,577, filed on Dec. 13, 2018, now Pat. No. 10,659,914, which is a
(Continued)

(51) Int. Cl.
*H04W 4/021* (2018.01)
*H04H 20/61* (2008.01)
(Continued)

(52) U.S. Cl.
CPC .......... *H04W 4/021* (2013.01); *G06F 3/0482* (2013.01); *G06F 40/279* (2020.01);
(Continued)

(58) Field of Classification Search
CPC ....... H04W 4/021; H04W 4/029; G06Q 50/01
See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
CA 2894332 C 8/2018
(Continued)

OTHER PUBLICATIONS

US 10,075,404 B1, 09/2018, Allen et al. (withdrawn)
(Continued)

*Primary Examiner* — Mazda Sabouri
(74) *Attorney, Agent, or Firm* — Schwegman Lundberg & Woessner, P.A.

(57) ABSTRACT

Systems and methods are provided for determining that geolocation data from a computing device corresponds to a geo-fence associated with a plurality of galleries and providing user-selectable gallery information comprising indicia for each of the plurality of galleries corresponding to the geo-fence to the computing device. The systems and methods further provide for receiving a first message comprising a photograph as the background for the message in response to a second message in a first gallery of the plurality of galleries, and adding the first message to the first gallery associated with a selection of the indicia for the first gallery in the plurality of galleries of the of user-selectable gallery information. The first message is accessible by other computing devices accessing the gallery information to view the first message comprising the photograph as the background of the first message.

20 Claims, 5 Drawing Sheets

Related U.S. Application Data continuation of application No. 15/946,990, filed on Apr. 6, 2018, now Pat. No. 10,524,087, which is a continuation of application No. 15/298,806, filed on Oct. 20, 2016, now Pat. No. 10,200,813, which is a continuation of application No. 14/738,069, filed on Jun. 12, 2015, now Pat. No. 9,532,171, which is a continuation of application No. 14/304,855, filed on Jun. 13, 2014, now Pat. No. 9,113,301.

(51) Int. Cl.
```
G06Q 30/02      (2012.01)
H04W 4/12       (2009.01)
H04W 4/029      (2018.01)
G06Q 50/00      (2012.01)
G06F 40/279     (2020.01)
H04L 51/52      (2022.01)
H04L 67/104     (2022.01)
H04W 60/00      (2009.01)
G06F 3/0482     (2013.01)
G06K 9/00       (2022.01)
G06T 13/00      (2011.01)
H04L 51/10      (2022.01)
H04L 51/222     (2022.01)
H04L 51/226     (2022.01)
```

(52) U.S. Cl.
CPC ..... *G06K 9/00483* (2013.01); *G06Q 30/0252* (2013.01); *G06Q 30/0261* (2013.01); *G06Q 30/0267* (2013.01); *G06Q 30/0275* (2013.01); *G06Q 30/0276* (2013.01); *G06Q 50/01* (2013.01); *G06T 13/00* (2013.01); *H04H 20/61* (2013.01); *H04L 51/10* (2013.01); *H04L 51/20* (2013.01); *H04L 51/26* (2013.01); *H04L 51/32* (2013.01); *H04L 67/104* (2013.01); *H04W 4/029* (2018.02); *H04W 4/12* (2013.01); *H04W 60/00* (2013.01); *G06K 2209/01* (2013.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,075,535 A | 6/2000 | Fitzhugh et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,290,504 B1 | 9/2001 | Benitz et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,363,380 B1 | 3/2002 | Dimitrova |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,499,016 B1 | 12/2002 | Anderson |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,004,394 B2 | 2/2006 | Kim |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,091 B1 | 10/2006 | Khoo et al. |
| 7,124,164 B1 | 10/2006 | Chemtob |
| 7,142,823 B1 | 11/2006 | Logue et al. |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,025 B2 | 7/2007 | Stone et al. |
| 7,240,089 B2 | 7/2007 | Boudreau |
| 7,243,163 B1 | 7/2007 | Friend et al. |
| 7,254,585 B2 | 8/2007 | Frieden et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,496,567 B1 | 2/2009 | Steichen |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,571,244 B2 | 8/2009 | Costanzo et al. |
| 7,607,096 B2 | 10/2009 | Oreizy et al. |

(56) References Cited

U.S. PATENT DOCUMENTS

| | | |
|---|---|---|
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,856,449 B1 | 12/2010 | Martino et al. |
| 7,912,896 B2 | 3/2011 | Wolovitz et al. |
| 7,934,156 B2 | 4/2011 | Forstall et al. |
| 7,991,638 B1 | 8/2011 | House et al. |
| 8,001,204 B2 | 8/2011 | Burtner et al. |
| 8,014,762 B2 | 9/2011 | Chmaytelli et al. |
| 8,032,586 B2 | 10/2011 | Challenger et al. |
| 8,063,797 B1 | 11/2011 | Sonnabend et al. |
| 8,073,947 B1 | 12/2011 | Yeh et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,127,035 B1 | 2/2012 | Hood et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,494 B1 | 1/2013 | Badoiu |
| 8,352,546 B1 | 1/2013 | Dollard |
| 8,369,866 B2 | 2/2013 | Ashley, Jr. et al. |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,471,914 B2 | 6/2013 | Sakiyama et al. |
| 8,472,935 B1 | 6/2013 | Fujisaki |
| 8,494,481 B1 | 7/2013 | Bacco et al. |
| 8,510,383 B2 | 8/2013 | Hurley et al. |
| 8,527,345 B2 | 9/2013 | Rothschild et al. |
| 8,542,685 B2 | 9/2013 | Forbes, Jr. et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,639,648 B2 | 1/2014 | Koponen et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,666,152 B1 | 3/2014 | Ramanathan et al. |
| 8,681,178 B1 | 3/2014 | Tseng |
| 8,682,350 B2 | 3/2014 | Altman et al. |
| 8,686,962 B2 | 4/2014 | Christie |
| 8,687,021 B2 | 4/2014 | Bathiche et al. |
| 8,688,519 B1 | 4/2014 | Lin et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,751,310 B2 | 6/2014 | Van Datta et al. |
| 8,761,800 B2 | 6/2014 | Kuwahara |
| 8,762,201 B1 | 6/2014 | Noonan |
| 8,768,876 B2 | 7/2014 | Shim et al. |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 | 7/2014 | Putz et al. |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,868,223 B1 | 10/2014 | Sharifi |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,925,106 B1 | 12/2014 | Steiner et al. |
| 8,943,140 B1 | 1/2015 | Kothari |
| 8,965,271 B1 | 2/2015 | Vucurevich |
| 8,972,357 B2 | 3/2015 | Shim et al. |
| 8,977,296 B1 | 3/2015 | Briggs et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,043,329 B1 | 5/2015 | Patton et al. |
| 9,055,416 B2 | 6/2015 | Rosen et al. |
| 9,063,638 B1 | 6/2015 | Schrock et al. |
| 9,083,770 B1 | 7/2015 | Drose et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,137,700 B2 | 9/2015 | Elefant et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,148,742 B1 | 9/2015 | Koulomzin et al. |
| 9,152,477 B1 | 10/2015 | Campbell et al. |
| 9,159,364 B1 | 10/2015 | Matias et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,319,472 B2 | 4/2016 | Cathcart et al. |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 | 8/2016 | Smith |
| 9,430,783 B1 | 8/2016 | Sehn |
| 9,439,041 B2 | 9/2016 | Parvizi et al. |

(56) References Cited

U.S. PATENT DOCUMENTS

| | | |
|---|---|---|
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,477,391 B2 | 10/2016 | Flynn, III et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,542,422 B2 | 1/2017 | Duggal et al. |
| 9,544,379 B2 | 1/2017 | Gauglitz et al. |
| 9,560,006 B2 | 1/2017 | Prado et al. |
| 9,591,445 B2 | 3/2017 | Zises |
| 9,628,950 B1 | 4/2017 | Noeth et al. |
| 9,641,572 B1 | 5/2017 | Yeskel et al. |
| 9,645,221 B1 | 5/2017 | Heizer |
| 9,648,581 B1 | 5/2017 | Vaynblat et al. |
| 9,652,896 B1 | 5/2017 | Jurgenson et al. |
| 9,659,244 B2 | 5/2017 | Anderton et al. |
| 9,672,538 B1 | 6/2017 | Vaynblat et al. |
| 9,674,660 B1 | 6/2017 | Vaynblat et al. |
| 9,693,191 B2 | 6/2017 | Sehn |
| 9,705,831 B2 | 7/2017 | Spiegel |
| 9,706,355 B1 | 7/2017 | Cali et al. |
| 9,710,821 B2 | 7/2017 | Heath |
| 9,742,713 B2 | 8/2017 | Spiegel et al. |
| 9,785,796 B1 | 10/2017 | Murphy et al. |
| 9,788,027 B1 | 10/2017 | Vucurevich |
| 9,802,121 B2 | 10/2017 | Ackley et al. |
| 9,825,898 B2 | 11/2017 | Sehn |
| 9,843,720 B1 | 12/2017 | Ebsen et al. |
| 9,854,219 B2 | 12/2017 | Sehn |
| 9,866,999 B1 | 1/2018 | Noeth |
| 9,881,094 B2 | 1/2018 | Pavlovskaia |
| 9,894,478 B1 | 2/2018 | Deluca et al. |
| 9,961,520 B2 | 5/2018 | Brooks et al. |
| 10,026,226 B1 | 7/2018 | Lotto |
| 10,080,102 B1 | 9/2018 | Noeth et al. |
| 10,133,705 B1 | 11/2018 | Allen et al. |
| 10,135,949 B1 | 11/2018 | Pavlovskaia et al. |
| 10,182,311 B2 | 1/2019 | Sehn |
| 10,186,299 B2 | 1/2019 | Wang et al. |
| 10,200,813 B1 | 2/2019 | Allen et al. |
| 10,250,683 B2 | 4/2019 | Karkkainen et al. |
| 10,284,508 B1 | 5/2019 | Allen et al. |
| 10,285,002 B2 | 5/2019 | Colonna et al. |
| 10,285,006 B2 | 5/2019 | Colonna et al. |
| 10,311,916 B2 | 6/2019 | Sehn |
| 10,349,209 B1 | 7/2019 | Noeth et al. |
| 10,354,425 B2 | 7/2019 | Yan et al. |
| 10,395,519 B2 | 8/2019 | Colonna et al. |
| 10,416,845 B1 | 9/2019 | Allen et al. |
| 10,438,094 B1 | 10/2019 | Ko et al. |
| 10,440,420 B2 | 10/2019 | Hogeg et al. |
| 10,448,201 B1 | 10/2019 | Sehn et al. |
| 10,476,830 B2 | 11/2019 | Allen et al. |
| 10,514,876 B2 | 12/2019 | Sehn |
| 10,524,087 B1 | 12/2019 | Allen et al. |
| 10,572,681 B1 | 2/2020 | Murphy et al. |
| 10,580,458 B2 | 3/2020 | Sehn |
| 10,581,782 B2 | 3/2020 | Tang |
| 10,582,277 B2 | 3/2020 | Tang |
| 10,616,239 B2 | 4/2020 | Allen et al. |
| 10,616,476 B1 | 4/2020 | Ebsen et al. |
| 10,623,891 B2 | 4/2020 | Sehn et al. |
| 10,659,914 B1 | 5/2020 | Allen et al. |
| 10,708,210 B1 | 7/2020 | Allen et al. |
| 10,779,113 B2 | 9/2020 | Sehn et al. |
| 10,811,053 B2 | 10/2020 | Sehn |
| 10,893,055 B2 | 1/2021 | Allen et al. |
| 10,944,710 B1 | 3/2021 | Allen et al. |
| 10,958,608 B1 | 3/2021 | Allen et al. |
| 10,990,697 B2 | 4/2021 | Murphy et al. |
| 11,012,398 B1 | 5/2021 | Allen et al. |
| 11,038,829 B1 | 6/2021 | Allen et al. |
| 11,166,121 B2 | 11/2021 | Sehn et al. |
| 2001/0025316 A1 | 9/2001 | Oh |
| 2001/0028787 A1 | 10/2001 | Nomura et al. |
| 2002/0023101 A1 | 2/2002 | Kurihara et al. |
| 2002/0032771 A1 | 3/2002 | Gledje |
| 2002/0047858 A1 | 4/2002 | Bayliss et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0098850 A1 | 7/2002 | Akhteruzzaman et al. |
| 2002/0122659 A1 | 9/2002 | Megrath et al. |
| 2002/0128047 A1 | 9/2002 | Gates |
| 2002/0141378 A1 | 10/2002 | Bays et al. |
| 2002/0144154 A1 | 10/2002 | Tomkow |
| 2002/0146103 A1 | 10/2002 | Holt et al. |
| 2002/0171669 A1 | 11/2002 | Meron et al. |
| 2003/0001846 A1 | 1/2003 | Davis et al. |
| 2003/0016247 A1 | 1/2003 | Lai et al. |
| 2003/0016253 A1 | 1/2003 | Aoki et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0074404 A1 | 4/2003 | Parker et al. |
| 2003/0083929 A1 | 5/2003 | Springer et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0131362 A1 | 7/2003 | Jasinschi et al. |
| 2003/0148773 A1 | 8/2003 | Spriestersbach et al. |
| 2003/0163370 A1 | 8/2003 | Chen et al. |
| 2003/0164856 A1 | 9/2003 | Prager et al. |
| 2003/0210280 A1 | 11/2003 | Baker et al. |
| 2003/0217106 A1 | 11/2003 | Adar et al. |
| 2003/0217118 A1 | 11/2003 | Kobayashi et al. |
| 2003/0229607 A1 | 12/2003 | Zellweger et al. |
| 2003/0236823 A1 | 12/2003 | Patzer et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0185877 A1 | 9/2004 | Asthana et al. |
| 2004/0189465 A1 | 9/2004 | Capobianco et al. |
| 2004/0193488 A1 | 9/2004 | Khoo et al. |
| 2004/0199402 A1 | 10/2004 | Walker et al. |
| 2004/0203959 A1 | 10/2004 | Coombes |
| 2004/0205480 A1 | 10/2004 | Moore |
| 2004/0205514 A1 | 10/2004 | Sommerer et al. |
| 2004/0215625 A1 | 10/2004 | Svendsen et al. |
| 2004/0243531 A1 | 12/2004 | Dean |
| 2004/0243688 A1 | 12/2004 | Wugofski |
| 2004/0243704 A1 | 12/2004 | Botelho et al. |
| 2005/0019014 A1 | 1/2005 | Yoo et al. |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0071435 A1 | 3/2005 | Karstens |
| 2005/0078804 A1 | 4/2005 | Yomoda |
| 2005/0097176 A1 | 5/2005 | Schatz et al. |
| 2005/0102180 A1 | 5/2005 | Gailey et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0004630 A1 | 1/2006 | Criddle et al. |
| 2006/0026067 A1 | 2/2006 | Nicholas et al. |
| 2006/0107297 A1 | 5/2006 | Toyama et al. |
| 2006/0109238 A1 | 5/2006 | Lau et al. |
| 2006/0114338 A1 | 6/2006 | Rothschild |

(56) References Cited

U.S. PATENT DOCUMENTS

| | | |
|---|---|---|
| 2006/0119882 A1 | 6/2006 | Harris et al. |
| 2006/0127054 A1 | 6/2006 | Matsuyama |
| 2006/0136297 A1 | 6/2006 | Willis et al. |
| 2006/0242234 A1 | 10/2006 | Counts et al. |
| 2006/0242239 A1 | 10/2006 | Morishima et al. |
| 2006/0242550 A1 | 10/2006 | Rahman et al. |
| 2006/0242554 A1 | 10/2006 | Gerace et al. |
| 2006/0252438 A1 | 11/2006 | Ansamaa et al. |
| 2006/0259359 A1 | 11/2006 | Gogel |
| 2006/0265417 A1 | 11/2006 | Amato et al. |
| 2006/0270419 A1 | 11/2006 | Crowley et al. |
| 2006/0282819 A1 | 12/2006 | Graham et al. |
| 2006/0287878 A1 | 12/2006 | Wadhwa et al. |
| 2007/0003221 A1 | 1/2007 | Hamada et al. |
| 2007/0004426 A1 | 1/2007 | Pfleging et al. |
| 2007/0028183 A1 | 2/2007 | Ostojic et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0067317 A1 | 3/2007 | Stevenson |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0088832 A1 | 4/2007 | Tsang et al. |
| 2007/0106706 A1 | 5/2007 | Ahrens et al. |
| 2007/0118801 A1 | 5/2007 | Harshbarger et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0250791 A1 | 10/2007 | Halliday et al. |
| 2007/0255456 A1 | 11/2007 | Funayama |
| 2007/0268988 A1 | 11/2007 | Hedayat et al. |
| 2007/0281690 A1 | 12/2007 | Altman et al. |
| 2007/0294735 A1 | 12/2007 | Luo |
| 2007/0299807 A1 | 12/2007 | Lea et al. |
| 2008/0005240 A1 | 1/2008 | Knighton et al. |
| 2008/0012987 A1 | 1/2008 | Hirata et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033795 A1 | 2/2008 | Wishnow et al. |
| 2008/0033930 A1 | 2/2008 | Warren |
| 2008/0043041 A2 | 2/2008 | Hedenstroem et al. |
| 2008/0046476 A1 | 2/2008 | Anderson et al. |
| 2008/0046831 A1 | 2/2008 | Imai et al. |
| 2008/0046956 A1 | 2/2008 | Kulas |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0091723 A1 | 4/2008 | Zuckerberg et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0160956 A1 | 7/2008 | Jackson et al. |
| 2008/0167106 A1 | 7/2008 | Lutnick |
| 2008/0168033 A1 | 7/2008 | Ott et al. |
| 2008/0168489 A1 | 7/2008 | Schraga |
| 2008/0172413 A1 | 7/2008 | Chiu |
| 2008/0189177 A1 | 8/2008 | Anderton et al. |
| 2008/0193101 A1 | 8/2008 | Agnihotri et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222158 A1 | 9/2008 | Saika |
| 2008/0222545 A1 | 9/2008 | Lemay |
| 2008/0244438 A1 | 10/2008 | Peters et al. |
| 2008/0255976 A1 | 10/2008 | Altberg et al. |
| 2008/0256430 A1 | 10/2008 | Gold |
| 2008/0256446 A1 | 10/2008 | Yamamoto |
| 2008/0256450 A1 | 10/2008 | Takakura et al. |
| 2008/0256577 A1 | 10/2008 | Funaki et al. |
| 2008/0263103 A1 | 10/2008 | Mcgregor et al. |
| 2008/0266421 A1 | 10/2008 | Takahata et al. |
| 2008/0270938 A1 | 10/2008 | Carlson |
| 2008/0284587 A1 | 11/2008 | Saigh et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0316181 A1 | 12/2008 | Nurmi |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0019472 A1 | 1/2009 | Cleland et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0087161 A1 | 4/2009 | Roberts et al. |
| 2009/0089169 A1 | 4/2009 | Gupta et al. |
| 2009/0089378 A1 | 4/2009 | Maresh |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0158183 A1 | 6/2009 | Mccurdy et al. |
| 2009/0160970 A1 | 6/2009 | Fredlund et al. |
| 2009/0163182 A1 | 6/2009 | Gatti et al. |
| 2009/0169062 A1 | 7/2009 | Cheung et al. |
| 2009/0177299 A1 | 7/2009 | Van De Sluis |
| 2009/0177588 A1 | 7/2009 | Marchese |
| 2009/0177730 A1 | 7/2009 | Annamalai et al. |
| 2009/0187825 A1 | 7/2009 | Sandquist et al. |
| 2009/0192900 A1 | 7/2009 | Collision |
| 2009/0197582 A1 | 8/2009 | Lewis et al. |
| 2009/0197616 A1 | 8/2009 | Lewis et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0235155 A1 | 9/2009 | Ueda |
| 2009/0239552 A1 | 9/2009 | Churchill et al. |
| 2009/0026001 A1 | 10/2009 | Burkhart et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284658 A1 | 11/2009 | Cho |
| 2009/0288022 A1 | 11/2009 | Almstrand et al. |
| 2009/0291665 A1 | 11/2009 | Gaskarth et al. |
| 2009/0291672 A1 | 11/2009 | Treves et al. |
| 2009/0292608 A1 | 11/2009 | Polachek |
| 2009/0300139 A1 | 12/2009 | Shoemaker et al. |
| 2009/0319607 A1 | 12/2009 | Belz et al. |
| 2009/0327073 A1 | 12/2009 | Li |
| 2010/0001980 A1 | 1/2010 | Kim et al. |
| 2010/0001316 A1 | 1/2010 | Sar et al. |
| 2010/0014833 A1 | 1/2010 | Pjanovic et al. |

(56) References Cited

U.S. PATENT DOCUMENTS

| | | |
|---|---|---|
| 2010/0039505 A1 | 2/2010 | Inoue et al. |
| 2010/0041378 A1 | 2/2010 | Aceves et al. |
| 2010/0062794 A1 | 3/2010 | Han |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0100729 A1 | 4/2010 | Read et al. |
| 2010/0113065 A1 | 5/2010 | Narayan et al. |
| 2010/0115281 A1 | 5/2010 | Camenisch et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0153197 A1 | 6/2010 | Byon |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0185750 A1 | 7/2010 | Nakayama |
| 2010/0185987 A1 | 7/2010 | Yang et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0199166 A1 | 8/2010 | Fisk, III |
| 2010/0199227 A1 | 8/2010 | Xiao et al. |
| 2010/0201482 A1 | 8/2010 | Robertson et al. |
| 2010/0201536 A1 | 8/2010 | Robertson et al. |
| 2010/0211431 A1 | 8/2010 | Lutnick et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0247064 A1 | 9/2010 | Yeh et al. |
| 2010/0250109 A1 | 9/2010 | Johnston et al. |
| 2010/0251143 A1 | 9/2010 | Thomas et al. |
| 2010/0257196 A1 | 10/2010 | Waters et al. |
| 2010/0259386 A1 | 10/2010 | Holley et al. |
| 2010/0262461 A1 | 10/2010 | Bohannon |
| 2010/0273463 A1 | 10/2010 | Bonnefoy |
| 2010/0273509 A1 | 10/2010 | Sweeney et al. |
| 2010/0281045 A1 | 11/2010 | Dean |
| 2010/0293105 A1 | 11/2010 | Blinn et al. |
| 2010/0299763 A1 | 11/2010 | Marcus et al. |
| 2010/0306669 A1 | 12/2010 | Della Pasqua |
| 2010/0332958 A1 | 12/2010 | Weinberger et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0037605 A1 | 2/2011 | Robison, Jr. et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0085059 A1 | 4/2011 | Noh |
| 2011/0099507 A1 | 4/2011 | Nesladek et al. |
| 2011/0099519 A1 | 4/2011 | Ma et al. |
| 2011/0102630 A1 | 5/2011 | Rukes |
| 2011/0106882 A1 | 5/2011 | Takakura et al. |
| 2011/0119133 A1 | 5/2011 | Igelman et al. |
| 2011/0131633 A1 | 6/2011 | Macaskill et al. |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0161423 A1 | 6/2011 | Pratt et al. |
| 2011/0164163 A1 | 7/2011 | Bilbrey et al. |
| 2011/0170838 A1 | 7/2011 | Rosengart et al. |
| 2011/0184980 A1 | 7/2011 | Jeong et al. |
| 2011/0191368 A1 | 8/2011 | Muzatko |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238300 A1 | 9/2011 | Schenken |
| 2011/0238762 A1 | 9/2011 | Soni et al. |
| 2011/0238763 A1 | 9/2011 | Shin et al. |
| 2011/0249551 A1 | 10/2011 | Rollins |
| 2011/0251790 A1 | 10/2011 | Liotopoulos et al. |
| 2011/0255736 A1 | 10/2011 | Thompson et al. |
| 2011/0256881 A1 | 10/2011 | Huang et al. |
| 2011/0273575 A1 | 11/2011 | Lee |
| 2011/0276637 A1 | 11/2011 | Thornton et al. |
| 2011/0282799 A1 | 11/2011 | Huston |
| 2011/0283172 A1 | 11/2011 | Berger et al. |
| 2011/0283188 A1 | 11/2011 | Farrenkopf |
| 2011/0286586 A1 | 11/2011 | Saylor et al. |
| 2011/0294541 A1 | 12/2011 | Zheng et al. |
| 2011/0295577 A1 | 12/2011 | Ramachandran |
| 2011/0295677 A1 | 12/2011 | Dhingra et al. |
| 2011/0296474 A1 | 12/2011 | Babic |
| 2011/0302525 A1 | 12/2011 | Jeon |
| 2011/0306387 A1 | 12/2011 | Moon |
| 2011/0314084 A1 | 12/2011 | Saretto et al. |
| 2011/0314419 A1 | 12/2011 | Dunn et al. |
| 2011/0320373 A1 | 12/2011 | Lee et al. |
| 2012/0004956 A1 | 1/2012 | Hustan |
| 2012/0019722 A1 | 1/2012 | Kwisthout et al. |
| 2012/0023522 A1 | 1/2012 | Anderson et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054001 A1 | 3/2012 | Zivkovic et al. |
| 2012/0054797 A1 | 3/2012 | Skog et al. |
| 2012/0054811 A1 | 3/2012 | Spears |
| 2012/0059722 A1 | 3/2012 | Rao |
| 2012/0062805 A1 | 3/2012 | Candelore |
| 2012/0070045 A1 | 3/2012 | Vesper et al. |
| 2012/0084731 A1 | 4/2012 | Filman et al. |
| 2012/0084835 A1 | 4/2012 | Thomas et al. |
| 2012/0098836 A1 | 4/2012 | Kim et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1 | 5/2012 | Koskimies |
| 2012/0123830 A1 | 5/2012 | Svendsen et al. |
| 2012/0123867 A1 | 5/2012 | Hannan |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124147 A1 | 5/2012 | Hamlin et al. |
| 2012/0124176 A1 | 5/2012 | Curtis et al. |
| 2012/0124458 A1 | 5/2012 | Cruzada |
| 2012/0127196 A1 | 5/2012 | Landry |
| 2012/0129548 A1 | 5/2012 | Rao et al. |
| 2012/0131507 A1 | 5/2012 | Sparandara et al. |
| 2012/0131512 A1 | 5/2012 | Takeuchi et al. |
| 2012/0136998 A1 | 5/2012 | Hough et al. |
| 2012/0143760 A1 | 6/2012 | Abulafia et al. |
| 2012/0150978 A1 | 6/2012 | Monaco |
| 2012/0158532 A1 | 6/2012 | Fitzsimmons |
| 2012/0163664 A1 | 6/2012 | Zhu |
| 2012/0165100 A1 | 6/2012 | Lalancette et al. |
| 2012/0166462 A1 | 6/2012 | Pathak et al. |

(56) References Cited

U.S. PATENT DOCUMENTS

| | | |
|---|---|---|
| 2012/0166468 A1 | 6/2012 | Gupta et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197690 A1 | 8/2012 | Agulnek |
| 2012/0197724 A1 | 8/2012 | Kendall |
| 2012/0200743 A1 | 8/2012 | Blanchflower et al. |
| 2012/0201362 A1 | 8/2012 | Crossan et al. |
| 2012/0203849 A1 | 8/2012 | Collins et al. |
| 2012/0208564 A1 | 8/2012 | Clark et al. |
| 2012/0209892 A1 | 8/2012 | Macaskill et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226663 A1 | 9/2012 | Valdez et al. |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0263439 A1 | 10/2012 | Lassman et al. |
| 2012/0271684 A1 | 10/2012 | Shutter |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0311465 A1 | 12/2012 | Nealer et al. |
| 2012/0311623 A1 | 12/2012 | Davis et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0004014 A1 | 1/2013 | Hickman |
| 2013/0006759 A1 | 1/2013 | Srivastava et al. |
| 2013/0006777 A1 | 1/2013 | Krishnareddy et al. |
| 2013/0018960 A1 | 1/2013 | Knysz et al. |
| 2013/0024292 A1 | 1/2013 | David |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057489 A1 | 3/2013 | Morton |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0076758 A1 | 3/2013 | Li et al. |
| 2013/0080254 A1 | 3/2013 | Thramann |
| 2013/0082959 A1 | 4/2013 | Shimazu et al. |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0115872 A1 | 5/2013 | Huang et al. |
| 2013/0117261 A1 | 5/2013 | Sambrani |
| 2013/0122862 A1 | 5/2013 | Horn et al. |
| 2013/0122929 A1 | 5/2013 | Al-mufti et al. |
| 2013/0124297 A1 | 5/2013 | Hegeman et al. |
| 2013/0128059 A1 | 5/2013 | Kristensson |
| 2013/0129252 A1 | 5/2013 | Lauper |
| 2013/0132194 A1 | 5/2013 | Rajaram |
| 2013/0132477 A1 | 5/2013 | Bosworth et al. |
| 2013/0132908 A1 | 5/2013 | Lee et al. |
| 2013/0144979 A1 | 6/2013 | Kansal et al. |
| 2013/0145286 A1 | 6/2013 | Feng et al. |
| 2013/0147837 A1 | 6/2013 | Stroila |
| 2013/0157684 A1 | 6/2013 | Moser |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173380 A1 | 7/2013 | Akbari et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0210518 A1 | 8/2013 | Barclay et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0254227 A1 | 9/2013 | Shim et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0283167 A1 | 10/2013 | Xu |
| 2013/0290337 A1 | 10/2013 | Lansford et al. |
| 2013/0290443 A1 | 10/2013 | Collins et al. |
| 2013/0304243 A1 | 11/2013 | Iseli |
| 2013/0304527 A1 | 11/2013 | Santos, III |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0003739 A1 | 1/2014 | S V et al. |
| 2014/0006129 A1 | 1/2014 | Heath |
| 2014/0011538 A1 | 1/2014 | Mulcahy et al. |
| 2014/0013243 A1 | 1/2014 | Flynn, III et al. |
| 2014/0019264 A1 | 1/2014 | Wachman et al. |
| 2014/0028589 A1 | 1/2014 | Reilly |
| 2014/0029034 A1 | 1/2014 | Toriyama |
| 2014/0032682 A1 | 1/2014 | Prado et al. |
| 2014/0031899 A1 | 2/2014 | Rosenthal et al. |
| 2014/0040712 A1 | 2/2014 | Chang et al. |
| 2014/0043204 A1 | 2/2014 | Basnayake et al. |
| 2014/0043355 A1 | 2/2014 | Kim et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047074 A1 | 2/2014 | Chung et al. |
| 2014/0047335 A1 | 2/2014 | Lewis et al. |
| 2014/0049652 A1 | 2/2014 | Moon et al. |
| 2014/0052281 A1 | 2/2014 | Eronen et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0068692 A1 | 3/2014 | Archibong et al. |
| 2014/0082651 A1 | 3/2014 | Sharifi |
| 2014/0086562 A1 | 3/2014 | Lassman et al. |
| 2014/0089264 A1 | 3/2014 | Talagala et al. |
| 2014/0089314 A1 | 3/2014 | Iizuka et al. |
| 2014/0092130 A1 | 4/2014 | Anderson et al. |
| 2014/0095296 A1 | 4/2014 | Angell et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |

(56) References Cited

U.S. PATENT DOCUMENTS

| | | |
|---|---|---|
| 2014/0129953 A1 | 5/2014 | Spiegel |
| 2014/0129981 A1 | 5/2014 | Soderberg |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0015641 A1 | 6/2014 | Wuersch et al. |
| 2014/0153902 A1 | 6/2014 | Pearson et al. |
| 2014/0155102 A1 | 6/2014 | Cooper et al. |
| 2014/0164118 A1 | 6/2014 | Polachi |
| 2014/0164979 A1 | 6/2014 | Deeter et al. |
| 2014/0172542 A1 | 6/2014 | Poncz et al. |
| 2014/0172877 A1 | 6/2014 | Rubinstein et al. |
| 2014/0173424 A1 | 6/2014 | Hogeg et al. |
| 2014/0173457 A1 | 6/2014 | Wang et al. |
| 2014/0180829 A1 | 6/2014 | Umeda |
| 2014/0188815 A1 | 7/2014 | Mentz et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0207860 A1 | 7/2014 | Wang et al. |
| 2014/0214471 A1 | 7/2014 | Schreiner, III |
| 2014/0222564 A1 | 8/2014 | Kranendonk et al. |
| 2014/0222913 A1 | 8/2014 | Cathcart et al. |
| 2014/0250465 A1 | 9/2014 | Mulholland et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279040 A1 | 9/2014 | Kuboyama |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0279540 A1 | 9/2014 | Jackson |
| 2014/0280140 A1 | 9/2014 | Ling et al. |
| 2014/0280537 A1 | 9/2014 | Pridmore et al. |
| 2014/0281847 A1 | 9/2014 | Marra et al. |
| 2014/0282096 A1 | 9/2014 | Rubinstein et al. |
| 2014/0286566 A1 | 9/2014 | Rhoads |
| 2014/0287779 A1 | 9/2014 | O'keefe et al. |
| 2014/0289157 A1 | 9/2014 | Kenna, III et al. |
| 2014/0289603 A1 | 9/2014 | Subrahmanya et al. |
| 2014/0289833 A1 | 9/2014 | Briceno |
| 2014/0029821 A1 | 10/2014 | Park et al. |
| 2014/0304622 A1 | 10/2014 | Jorasch et al. |
| 2014/0306986 A1 | 10/2014 | Gottesman et al. |
| 2014/0317302 A1 | 10/2014 | Naik |
| 2014/0320662 A1 | 10/2014 | Mcnamee et al. |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0325569 A1 | 10/2014 | Suzuki et al. |
| 2014/0331188 A1 | 11/2014 | Sandstrom et al. |
| 2014/0337123 A1 | 11/2014 | Nuernberg et al. |
| 2014/0344698 A1 | 11/2014 | Hohteri et al. |
| 2014/0359024 A1 | 12/2014 | Spiegel |
| 2014/0359032 A1 | 12/2014 | Spiegel et al. |
| 2014/0359656 A1 | 12/2014 | Banica et al. |
| 2014/0372844 A1 | 12/2014 | Zumkhawala |
| 2014/0372850 A1 | 12/2014 | Campbell et al. |
| 2014/0379683 A1 | 12/2014 | Bazaz |
| 2015/0012603 A1 | 1/2015 | Saito |
| 2015/0013016 A1 | 1/2015 | Kanter et al. |
| 2015/0015680 A1 | 1/2015 | Wang et al. |
| 2015/0020086 A1 | 1/2015 | Chen et al. |
| 2015/0040011 A1 | 2/2015 | Chun |
| 2015/0042572 A1 | 2/2015 | Lombardi et al. |
| 2015/0043033 A1 | 2/2015 | Sugimoto |
| 2015/0046278 A1 | 2/2015 | Pei et al. |
| 2015/0055197 A1 | 2/2015 | Romanoff et al. |
| 2015/0058916 A1 | 2/2015 | Rostami-hesarsorkh et al. |
| 2015/0058957 A1 | 2/2015 | Halliday et al. |
| 2015/0063724 A1 | 3/2015 | Ikeda et al. |
| 2015/0071619 A1 | 3/2015 | Brough |
| 2015/0081630 A1 | 3/2015 | Linsalata et al. |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0096042 A1 | 4/2015 | Mizrachi |
| 2015/0103097 A1 | 4/2015 | Li |
| 2015/0116529 A1 | 4/2015 | Wu et al. |
| 2015/0127643 A1 | 5/2015 | Cohen et al. |
| 2015/0127754 A1 | 5/2015 | Clark et al. |
| 2015/0130178 A1 | 5/2015 | Clements |
| 2015/0134318 A1 | 5/2015 | Cuthbert et al. |
| 2015/0142753 A1 | 5/2015 | Soon-shiong |
| 2015/0154650 A1 | 6/2015 | Umeda |
| 2015/0161178 A1 | 6/2015 | Bãdoiu |
| 2015/0161822 A1 | 6/2015 | Basu |
| 2015/0169827 A1 | 6/2015 | Laborde |
| 2015/0172534 A1 | 6/2015 | Miyakawaa et al. |
| 2015/0177937 A1 | 6/2015 | Poletto et al. |
| 2015/0178260 A1 | 6/2015 | Brunson |
| 2015/0186497 A1 | 7/2015 | Patton et al. |
| 2015/0188869 A1 | 7/2015 | Gilad et al. |
| 2015/0193685 A1 | 7/2015 | Srinivasan et al. |
| 2015/0199082 A1 | 7/2015 | Scholler et al. |
| 2015/0206349 A1 | 7/2015 | Rosenthal et al. |
| 2015/0222814 A1 | 8/2015 | Li et al. |
| 2015/0227602 A1 | 8/2015 | Ramu et al. |
| 2015/0237472 A1 | 8/2015 | Alsina et al. |
| 2015/0237473 A1 | 8/2015 | Koepke |
| 2015/0248683 A1 | 9/2015 | Walkingshaw |
| 2015/0254704 A1 | 9/2015 | Kothe et al. |
| 2015/0261917 A1 | 9/2015 | Smith |
| 2015/0262208 A1 | 9/2015 | Bjontegard |
| 2015/0269624 A1 | 9/2015 | Cheng et al. |
| 2015/0271779 A1 | 9/2015 | Alavudin |
| 2015/0287072 A1 | 10/2015 | Golden et al. |
| 2015/0294367 A1 | 10/2015 | Oberbrunner et al. |
| 2015/0312184 A1 | 10/2015 | Langholz et al. |
| 2015/0032651 A1 | 11/2015 | Tomlinson et al. |
| 2015/0033231 A1 | 11/2015 | Cui et al. |
| 2015/0325268 A1 | 11/2015 | Berger et al. |
| 2015/0332317 A1 | 11/2015 | Cui et al. |
| 2015/0332325 A1 | 11/2015 | Sharma et al. |
| 2015/0332329 A1 | 11/2015 | Luo et al. |
| 2015/0334347 A1 | 11/2015 | Kang et al. |
| 2015/0341747 A1 | 11/2015 | Barrand et al. |
| 2015/0350136 A1 | 12/2015 | Flynn, III et al. |
| 2015/0356190 A1 | 12/2015 | Rotem et al. |
| 2015/0358806 A1 | 12/2015 | Salqvist |
| 2015/0365795 A1 | 12/2015 | Allen et al. |
| 2015/0367233 A1 | 12/2015 | Hicks et al. |
| 2015/0378502 A1 | 12/2015 | Hu et al. |
| 2015/0381682 A1 | 12/2015 | Rao et al. |
| 2015/0381688 A1 | 12/2015 | Jenkins et al. |
| 2016/0006927 A1 | 1/2016 | Sehn |
| 2016/0014063 A1 | 1/2016 | Hogeg et al. |
| 2016/0019592 A1 | 1/2016 | Muttineni et al. |
| 2016/0034253 A1 | 2/2016 | Bang et al. |
| 2016/0034712 A1 | 2/2016 | Patton et al. |
| 2016/0034786 A1 | 2/2016 | Suri et al. |
| 2016/0048369 A1 | 2/2016 | Zenoff |
| 2016/0050704 A1 | 2/2016 | von Sneidern et al. |
| 2016/0085773 A1 | 3/2016 | Chang et al. |
| 2016/0085863 A1 | 3/2016 | Allen et al. |
| 2016/0085994 A1 | 3/2016 | Pereira |
| 2016/0086670 A1 | 3/2016 | Gross et al. |
| 2016/0092561 A1 | 3/2016 | Liu et al. |
| 2016/0092962 A1 | 3/2016 | Wasserman et al. |
| 2016/0098742 A1 | 4/2016 | Minicucci et al. |
| 2016/0099901 A1 | 4/2016 | Allen et al. |
| 2016/0105387 A1 | 4/2016 | Jackson |
| 2016/0119272 A1 | 4/2016 | Rubinstein et al. |
| 2016/0134941 A1 | 5/2016 | Selvaraj |
| 2016/0139748 A1 | 5/2016 | Iwaizumi et al. |
| 2016/0149843 A1 | 5/2016 | Spicer et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0196584 A1 | 7/2016 | Franklin et al. |
| 2016/0210657 A1 | 7/2016 | Chittilappilly et al. |
| 2016/0219402 A1 | 7/2016 | Zimerman et al. |
| 2016/0234023 A1 | 8/2016 | Mozer et al. |

(56) References Cited

U.S. PATENT DOCUMENTS

| | | |
|---|---|---|
| 2016/0234556 A1 | 8/2016 | Berridge |
| 2016/0239248 A1 | 8/2016 | Sehn |
| 2016/0239457 A1 | 8/2016 | Gross et al. |
| 2016/0247537 A1 | 8/2016 | Ricciardi |
| 2016/0253833 A1 | 9/2016 | Lew |
| 2016/0253912 A1 | 9/2016 | Heilman et al. |
| 2016/0274705 A1 | 9/2016 | Kapadia et al. |
| 2016/0277419 A1 | 9/2016 | Allen et al. |
| 2016/0286244 A1 | 9/2016 | Chang et al. |
| 2016/0292735 A1 | 10/2016 | Kim |
| 2016/0321708 A1 | 11/2016 | Sehn |
| 2016/0352659 A1 | 12/2016 | Krishnamoorth |
| 2016/0359957 A1 | 12/2016 | Laliberte |
| 2016/0359987 A1 | 12/2016 | Laliberte |
| 2016/0364668 A1 | 12/2016 | Young et al. |
| 2017/0006094 A1 | 1/2017 | Abou Mahmoud et al. |
| 2017/0026786 A1 | 1/2017 | Barron et al. |
| 2017/0061308 A1 | 3/2017 | Chen et al. |
| 2017/0078760 A1 | 3/2017 | Christoph et al. |
| 2017/0091795 A1 | 3/2017 | Mansour et al. |
| 2017/0111617 A1 | 4/2017 | Kuwahara et al. |
| 2017/0127233 A1 | 5/2017 | Liang et al. |
| 2017/0132647 A1 | 5/2017 | Bostick et al. |
| 2017/0134821 A1 | 5/2017 | D'amelio et al. |
| 2017/0149717 A1 | 5/2017 | Sehn |
| 2017/0161382 A1 | 6/2017 | Ouimet et al. |
| 2017/0164161 A1 | 6/2017 | Gupta et al. |
| 2017/0185256 A1 | 6/2017 | Bennett |
| 2017/0186038 A1 | 6/2017 | Glover et al. |
| 2017/0222962 A1 | 8/2017 | Gauglitz et al. |
| 2017/0230315 A1 | 8/2017 | Zubas et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310888 A1 | 10/2017 | Wright et al. |
| 2017/0329481 A1 | 11/2017 | Stoop et al. |
| 2017/0339521 A1 | 11/2017 | Colonna et al. |
| 2017/0359686 A1 | 12/2017 | Colonna et al. |
| 2017/0374003 A1 | 12/2017 | Allen et al. |
| 2017/0374508 A1 | 12/2017 | Davis et al. |
| 2018/0013975 A1 | 1/2018 | Tang |
| 2018/0103002 A1 | 4/2018 | Sehn |
| 2018/0121957 A1 | 5/2018 | Cornwall et al. |
| 2018/0131663 A1 | 5/2018 | Halliday et al. |
| 2018/0139241 A1 | 5/2018 | Jacobsen et al. |
| 2018/0189835 A1 | 7/2018 | Deluca et al. |
| 2018/0225687 A1 | 8/2018 | Ahmed et al. |
| 2018/0278562 A1 | 9/2018 | Tang |
| 2018/0279016 A1 | 9/2018 | Tang |
| 2018/0301169 A1 | 10/2018 | Ricciardi |
| 2018/0316575 A1 | 11/2018 | Son et al. |
| 2019/0097812 A1 | 3/2019 | Toth |
| 2019/0237106 A1 | 8/2019 | Sehn |
| 2019/0342699 A1 | 11/2019 | Sehn et al. |
| 2019/0372991 A1 | 12/2019 | Allen et al. |
| 2020/0057590 A1 | 2/2020 | Sehn |
| 2020/0105304 A1 | 4/2020 | Sehn |
| 2020/0193053 A1 | 6/2020 | Murphy et al. |
| 2020/0213804 A1 | 7/2020 | Sehn et al. |
| 2020/0329336 A1 | 10/2020 | Sehn et al. |
| 2020/0411058 A1 | 12/2020 | Sehn |
| 2021/0006526 A1 | 1/2021 | Allen et al. |
| 2021/0006527 A1 | 1/2021 | Allen et al. |
| 2021/0006528 A1 | 1/2021 | Allen et al. |
| 2021/0014238 A1 | 1/2021 | Allen et al. |
| 2021/0273903 A1 | 9/2021 | Allen et al. |
| 2021/0342473 A1 | 11/2021 | Murphy et al. |

FOREIGN PATENT DOCUMENTS

| | | |
|---|---|---|
| CA | 2910158 C | 6/2019 |
| CN | 101635763 A | 1/2010 |
| CN | 101981987 A | 2/2011 |
| CN | 102236848 A | 11/2011 |
| CN | 102238107 A | 11/2011 |
| CN | 102572575 A | 7/2012 |
| CN | 102930107 A | 2/2013 |
| CN | 103020303 A | 4/2013 |
| CN | 103095768 A | 5/2013 |
| CN | 103200238 A | 7/2013 |
| CN | 103248761 A | 8/2013 |
| CN | 103391368 A | 11/2013 |
| CN | 103699662 A | 4/2014 |
| CN | 105760466 A | 7/2016 |
| CN | 106663264 A | 5/2017 |
| CN | 107004225 A | 8/2017 |
| CN | 107111828 A | 8/2017 |
| CN | 107251006 A | 10/2017 |
| CN | 107637099 A | 1/2018 |
| CN | 107710772 A | 2/2018 |
| CN | 106663264 B | 5/2019 |
| CN | 110163663 A | 8/2019 |
| CN | 110249359 A | 9/2019 |
| CN | 110462616 A | 11/2019 |
| CN | 107111828 B | 5/2021 |
| CN | 113112306 A | 7/2021 |
| DE | 202015009885 U1 | 1/2021 |
| EP | 2051480 A1 | 4/2009 |
| EP | 2151797 A1 | 2/2010 |
| GB | 2399928 A | 9/2004 |
| JP | 2012104106 A | 5/2012 |
| KR | 19990073076 A | 10/1999 |
| KR | 20010078417 A | 8/2001 |
| KR | 20060008469 A | 1/2006 |
| KR | 1020060038872 A | 5/2006 |
| KR | 20060102677 A | 9/2006 |
| KR | 20070121728 A | 12/2007 |
| KR | 1020080006729 A | 1/2008 |
| KR | 1020080017854 A | 2/2008 |
| KR | 20080028962 A | 4/2008 |
| KR | 20100006371 A | 1/2010 |
| KR | 20120121452 A | 11/2012 |
| KR | 20120125381 A | 11/2012 |
| KR | 1020120140404 A | 12/2012 |
| KR | 20130061724 A | 6/2013 |
| KR | 20140066278 A | 6/2014 |
| KR | 1020140066795 A | 6/2014 |
| KR | 1020140115413 A | 10/2014 |
| KR | 10-1822920 | 1/2018 |
| KR | 101869473 | 6/2018 |
| KR | 101933840 B1 | 12/2018 |
| KR | 101983523 B1 | 5/2019 |
| KR | 102017508 B1 | 8/2019 |
| KR | 102021727 B1 | 9/2019 |
| KR | 10-2035405 B1 | 10/2019 |
| KR | 102051788 B1 | 12/2019 |
| KR | 102057592 B1 | 12/2019 |
| KR | 102077441 B1 | 2/2020 |
| KR | 10-2094065 B1 | 3/2020 |
| KR | 20177014135 A | 3/2020 |
| KR | 102207784 B1 | 1/2021 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013006584 A1 | 1/2013 |
| WO | WO-2013008238 A1 | 1/2013 |
| WO | WO-2013008251 A2 | 1/2013 |
| WO | WO-2013045753 A1 | 4/2013 |
| WO | WO-2013058897 A1 | 4/2013 |
| WO | WO-2013126784 A2 | 8/2013 |
| WO | WO-2014006129 A1 | 1/2014 |
| WO | WO-2014031562 A1 | 2/2014 |
| WO | WO-2014068573 A1 | 5/2014 |
| WO | WO-2014093668 A1 | 6/2014 |
| WO | WO-2014115136 A1 | 7/2014 |
| WO | WO-2014172388 A1 | 10/2014 |

(56) References Cited

FOREIGN PATENT DOCUMENTS

| | | |
|---|---|---|
| WO | WO-2014194262 A2 | 12/2014 |
| WO | WO-2015192026 A1 | 12/2015 |
| WO | WO-2016007285 A1 | 1/2016 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016123381 A1 | 8/2016 |
| WO | WO-2016149594 A1 | 9/2016 |
| WO | WO-2016179166 A1 | 11/2016 |
| WO | WO-2016179235 A1 | 11/2016 |
| WO | WO-2016202890 A1 | 12/2016 |
| WO | WO-2017106529 A1 | 6/2017 |
| WO | WO-2017176739 A1 | 10/2017 |
| WO | WO-2017176992 A1 | 10/2017 |
| WO | WO-2018005644 A1 | 1/2018 |
| WO | WO-2018144931 A1 | 8/2018 |
| WO | WO-2018183119 A1 | 10/2018 |

OTHER PUBLICATIONS

US 10,425,370 B2, 09/2019, Allen et al. (withdrawn)
US 10,484,394 B2, 11/2019, Allen et al. (withdrawn)
US 10,503,924 B1, 12/2019, Murphy et al. (withdrawn)
US 10,542,011 B2, 01/2020, Allen et al. (withdrawn)
U.S. Appl. No. 17/035,575, filed Sep. 28, 2020, Geo-Fence Authorization Provisioning.
U.S. Appl. No. 16/933,205, filed Jul. 20, 2020, Ephemeral Message Collection UI Indicia.
U.S. Appl. No. 16/933,279, filed Jul. 20, 2020, Display Duration Assignment for Ephemeral Messages.
U.S. Appl. No. 16/933,366, filed Jul. 20, 2020, Automated Management of Ephemeral Message Collections.
U.S. Appl. No. 17/023,175, filed Sep. 16, 2020, Routing Messages by Message Parameter.
"U.S. Appl. No. 16/541,919, Notice of Allowance dated Jun. 30, 2020", 8 pgs.
"U.S. Appl. No. 15/224,365, Final Office Action dated Jul. 2, 2020", 11 pgs.
"U.S. Appl. No. 16/000,657, Response filed Jul. 6, 2020 to Non Final Office Action dated Mar. 6, 2020", 13 pgs.
"Korean Application Serial No. 10-2020-7008140, Notice of Preliminary Rejection dated Jun. 16, 2020", w/ English Translation, 7 pgs.
"U.S. Appl. No. 15/947,350, Examiner Interview Summary dated Jul. 20, 2020", 4 pgs.
"U.S. Appl. No. 16/709,092, Corrected Notice of Allowability dated Jul. 22, 2020", 2 pgs.
"U.S. Appl. No. 16/000,657, Final Office Action dated Jul. 27, 2020", 17 pgs.
"U.S. Appl. No. 15/224,343, Notice of Allowance dated Jul. 29, 2020", 7 pgs.
"U.S. Appl. No. 16/529,461, Response filed Jul. 29, 2020 to Non Final Office Action dated May 21, 2020", 11 pgs.
"U.S. Appl. No. 16/529,461, Examiner Interview Summary dated Jul. 31, 2020", 3 pgs.
"U.S. Appl. No. 16/703,526, Supplemental Notice of Allowability dated Aug. 10, 2020", 2 pgs.
"Chinese Application Serial No. 201580070593.1, Response filed Aug. 13, 2020 to Office Action dated Apr. 8, 2020", w/English Claims.
"U.S. Appl. No. 15/224,355, Response filed Sep. 1, 2020 to Final Office Action dated May 1, 2020", 16 pgs.
"U.S. Appl. No. 15/224,359, Response filed Sep. 1, 2020 to Final Office Action dated May 1, 2020", 13 pgs.
"U.S. Appl. No. 16/703,526, Corrected Notice of Allowability dated Sep. 2, 2020", 2 pgs.
"U.S. Appl. No. 15/947,350, Response filed Sep. 4, 2020 to Final Office Action dated May 4, 2020", 12 pgs.
"U.S. Appl. No. 15/224,377, Response filed Sep. 8, 2020 to Final Office Action dated May 5, 2020", 15 pgs.
"Korean Application Serial No. 10-2020-7008140, Response filed Aug. 14, 2020 to Notice of Preliminary Rejection dated Jun. 16, 2020", w/ English Claims, 21 pgs.
"U.S. Appl. No. 16/000,657, Examiner Interview Summary dated Sep. 25, 2020", 3 pgs.
"U.S. Appl. No. 15/947,350, Non Final Office Action dated Sep. 28, 2020", 13 pgs.
"U.S. Appl. No. 16/000,657, Response filed Sep. 28, 2020 to Final Office Action dated Jul. 27, 2020", 12 pgs.
"U.S. Appl. No. 15/224,312, Response filed Oct. 1, 2020 to Final Office Action dated May 1, 2020", 18 pgs.
"U.S. Appl. No. 15/224,365, Response filed Oct. 2, 2020 to Final Office Action dated Jul. 2, 2020", 13 pgs.
"U.S. Appl. No. 15/224,372, Response filed Oct. 5, 2020 to Final Office Action dated May 4, 2020", 17 pgs.
"U.S. Appl. No. 16/662,956, Non Final Office Action dated Oct. 6, 2020", 13 pgs.
"Canadian Application Serial No. 3,027,981, Office Action dated Oct. 2, 2020", 5 pgs.
"U.S. Appl. No. 16/541,919, Notice of Allowance dated Oct. 15, 2020", 8 pgs.
"U.S. Appl. No. 16/000,657, Advisory Action dated Oct. 19, 2020", 3 pgs.
"U.S. Appl. No. 16/529,461, Final Office Action dated Oct. 20, 2020", 24 pgs.
"U.S. Appl. No. 15/224,377, Non Final Office Action dated Oct. 30, 2020", 15 pgs.
"U.S. Appl. No. 16/667,814, Response filed Oct. 29, 2020 to Non Final Office Action dated Aug. 17, 2020", 7 pgs.
"U.S. Appl. No. 15/224,359, Notice of Allowance dated Nov. 3, 2020", 15 pgs.
"U.S. Appl. No. 15/224,312, Non Final Office Action dated Nov. 9, 2020", 18 pgs.
U.S. Appl. No. 14/494,226, filed Sep. 23, 2014, User Interface to Augment an Image (as amended).
U.S. Appl. No. 14/612,692, U.S. Pat. No. 10,133,705, filed Feb. 3, 2015, Multichannel System.
U.S. Appl. No. 15/152,975, U.S. Pat. No. 10,416,845, filed May 12, 2016, Multichannel System.
U.S. Appl. No. 16/529,461, filed Aug. 1, 2019, Multichannel System.
U.S. Appl. No. 15/074,029, U.S. Pat. No. 10,616,239, filed Mar. 18, 2016, Geo-Fence Authorization Provisioning.
U.S. Appl. No. 16/541,919, filed Aug. 15, 2019, Geo-Fence Authorization Provisioning.
U.S. Appl. No. 15/702,511, U.S. Pat. No. 10,476,830, filed Sep. 12, 2017, Ephemeral Gallery of Ephemeral Messages.
U.S. Appl. No. 15/947,350, filed Apr. 6, 2018, Automated Chronological Display of Ephemeral Message Gallery (as amended).
U.S. Appl. No. 14/505,478, U.S. Pat. No. 9,537,811, filed Oct. 2, 2014, Ephemeral Gallery of Ephemeral Messages.
U.S. Appl. No. 15/224,312, filed Jul. 29, 2016, Gallery of Ephemeral Messages.
U.S. Appl. No. 15/224,343, filed Jul. 29, 2016, Ephemeral Gallery of Visual Media Messages.
U.S. Appl. No. 15/224,355, filed Jul. 29, 2016, Ephemeral Gallery Elimination Based on Gallery and Message Timers (as amended).
U.S. Appl. No. 15/224,359, filed Jul. 29, 2016, Ephemeral Gallery User Interface With Remaining Gallery Time Indication.
U.S. Appl. No. 15/224,365, filed Jul. 29, 2016, Gallery User Interface With Last Posted Message Indication (as amended).
U.S. Appl. No. 15/224,372, filed Jul. 29, 2016, Ephemeral Message Gallery User Interface With Screenshot Messages.
U.S. Appl. No. 15/224,377, filed Jul. 29, 2016, Ephemeral Message Gallery User Interface With Online Viewing History Indicia.
U.S. Appl. No. 15/224,383, filed Jul. 29, 2016, Multi-User Ephemeral Message Gallery.
U.S. Appl. No. 14/578,271, U.S. Pat. No. 9,854,219, filed Dec. 19, 2014, Gallery of Videos Set to an Audio Time Line.

(56) References Cited

OTHER PUBLICATIONS

U.S. Appl. No. 14/967,472, U.S. Pat. No. 10,311,916, filed Dec. 14, 2015, Gallery of Videos Set to an Audio Time Line.
U.S. Appl. No. 16/376,598, U.S. Pat. No. 10,580,458, filed Apr. 5, 2019, Gallery of Videos Set to an Audio Time Line.
U.S. Appl. No. 16/703,526, filed Dec. 4, 2019, Routing Messages by Message Parameter.
U.S. Appl. No. 14/634,417, U.S. Pat. No. 10,284,508, filed Feb. 27, 2015, Ephemeral Gallery of Ephemeral Messages With Opt-In Permanence.
U.S. Appl. No. 16/000,657, filed Jun. 5, 2018, Ephemeral Gallery of Ephemeral Messages With Opt-In Permanence.
U.S. Appl. No. 14/304,855, U.S. Pat. No. 9,113,301, filed Jun. 13, 2014, Geo-Location Based Event Gallery.
U.S. Appl. No. 14/738,069, U.S. Pat. No. 9,532,171, filed Jun. 12, 2015, Geo-Location Based Event Gallery.
U.S. Appl. No. 15/298,806, U.S. Pat. No. 10,200,813, filed Oct. 20, 2016, Geo-Location Based Event Gallery.
U.S. Appl. No. 15/946,990, U.S. Pat. No. 10,524,087, filed Apr. 6, 2018, Message Destination List Mechanism (as amended).
U.S. Appl. No. 16/219,577, filed Dec. 13, 2018, Geo-Location Based Event Gallery.
U.S. Appl. No. 14/529,064, filed Oct. 30, 2014, Priority Based Placement of Messages in Geo-Location Based Event Gallery.
U.S. Appl. No. 14/578,258, U.S. Pat. No. 9,385,983, filed Dec. 19, 2014, Gallery of Messages From Individuals With a Shared Interest.
U.S. Appl. No. 15/137,608, U.S. Pat. No. 10,514,876, filed Apr. 25, 2016, Gallery of Messages From Individuals With a Shared Interest.
U.S. Appl. No. 16/662,956, filed Oct. 24, 2019, Gallery of Messages From Individuals With a Shared Interest.
U.S. Appl. No. 14/523,728, U.S. Pat. No. 9,094,137, filed Oct. 24, 2014, Priority Based Placement of Messages in a Geo-Location Based Event Gallery.
U.S. Appl. No. 14/808,283, U.S. Pat. No. 9,430,783, filed Jul. 24, 2015, Prioritization of Messages Within Gallery.
U.S. Appl. No. 15/208,460, U.S. Pat. No. 9,693,191, filed Jul. 12, 2016, Prioritization of Messages Within Gallery.
U.S. Appl. No. 15/416,846, U.S. Pat. No. 9,825,898, filed Jan. 26, 2017, Prioritization of Messages Within a Message Collection.
U.S. Appl. No. 15/787,467, U.S. Pat. No. 10,182,311, filed Oct. 18, 2017, Prioritization of Messages Within a Message Collection.
U.S. Appl. No. 16/204,886, U.S. Pat. No. 10,448,201, filed Nov. 29, 2018, Prioritization of Messages Within a Message Collection.
U.S. Appl. No. 16/511,834, U.S. Pat. No. 10,623,891, filed Jul. 15, 2019, Prioritization of Messages Within a Message Collection.
U.S. Appl. No. 16/709,092, filed Dec. 10, 2019, Prioritization of Messages Within a Message Collection.
U.S. Appl. No. 14/723,400, U.S. Pat. No. 9,396,354, filed May 27, 2015, Apparatus and Method for Automated Privacy Protection in Distributed Images.
U.S. Appl. No. 15/212,095, U.S. Pat. No. 9,785,796, filed Jul. 15, 2016, Apparatus and Method for Automated Privacy Protection in Distributed Images.
U.S. Appl. No. 15/729,582, U.S. Pat. No. 10,572,681, filed Oct. 10, 2017, Apparatus and Method for Automated Privacy Protection in Distributed Images.
U.S. Appl. No. 16/667,814, filed Oct. 29, 2019, Apparatus and Method for Automated Privacy Protection in Distributed Images.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"Android Getting Started Guide", Voxer Business, [Online] Retrieved from the Internet: <URL: https://voxer.com/assets/AndroidGuide.pdf>, (Feb. 1, 2014), 18 pgs.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/494,226, Appeal Brief filed Mar. 1, 2019 in response to Final Office Action dated Jun. 1, 2018", 29 pgs.
"U.S. Appl. No. 14/494,226, Examiner Interview Summary dated Oct. 27, 2016", 3 pgs.
"U.S. Appl. No. 14/494,226, Examiner Interview Summary dated Dec. 20, 2017", 2 pgs.
"U.S. Appl. No. 14/494,226, Final Office Action dated Mar. 7, 2017", 34 pgs.
"U.S. Appl. No. 14/494,226, Final Office Action dated Jun. 1, 2018", 33 pgs.
"U.S. Appl. No. 14/494,226, Non Final Office Action dated Sep. 7, 2017", 36 pgs.
"U.S. Appl. No. 14/494,226, Non Final Office Action dated Sep. 12, 2016", 32 pgs.
"U.S. Appl. No. 14/494,226, Response filed Jan. 8, 2018 to Non Final Office Action dated Sep. 7, 2017", 15 pgs.
"U.S. Appl. No. 14/494,226, Response filed Jul. 7, 2017 to Final Office Action dated Mar. 7, 2017", 13 pgs.
"U.S. Appl. No. 14/494,226, Response filed Dec. 12, 2016 to Non Final Office Action dated Sep. 12, 2016", 16 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015", 10 pgs.
"U.S. Appl. No. 14/510,016, Advisory Action dated Nov. 30, 2017", 7 pgs.
"U.S. Appl. No. 14/510,016, Final Office Action dated May 22, 2018", 36 pgs.
"U.S. Appl. No. 14/510,016, Final Office Action dated Sep. 7, 2018", 34 pgs.
"U.S. Appl. No. 14/510,016, Final Office Action dated Sep. 8, 2017", 21 pgs.
"U.S. Appl. No. 14/510,016, Non Final Office Action dated Feb. 7, 2018", 36 pgs.
"U.S. Appl. No. 14/510,016, Non Final Office Action dated Apr. 21, 2017", 55 pgs.
"U.S. Appl. No. 14/510,016, Response filed Jan. 8, 2017 to Final Office Action dated Sep. 8, 2017", 22 pgs.

(56) References Cited

OTHER PUBLICATIONS

"U.S. Appl. No. 14/510,016, Response Filed May 7, 2018 to Non Final Office Action dated Feb. 7, 2018", 13 pgs.
"U.S. Appl. No. 14/510,016, Response Filed Jul. 21, 2017 to Non Final Office Action dated Apr. 21, 2017", 21 pgs.
"U.S. Appl. No. 14/510,016, Response filed Aug. 23, 2018 to Final Office Action dated May 22, 2018", 16 pgs.
"U.S. Appl. No. 14/510,016, Response filed Nov. 8, 2017 to Final Office Action dated Sep. 8, 2017", 24 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Examiner Interview Summary dated May 23, 2016", 3 pgs.
"U.S. Appl. No. 14/529,064, Examiner Interview Summary dated Nov. 17, 2016", 3 pgs.
"U.S. Appl. No. 14/529,064, Final Office Action dated Jan. 25, 2018", 39 pgs.
"U.S. Appl. No. 14/529,064, Final Office Action dated Aug. 11, 2015", 23 pgs.
"U.S. Appl. No. 14/529,064, Final Office Action dated Aug. 24, 2016", 23 pgs.
"U.S. Appl. No. 14/529,064, Non Final Office Action dated Mar. 12, 2015", 20 pgs.
"U.S. Appl. No. 14/529,064, Non Final Office Action dated Apr. 6, 2017", 25 pgs.
"U.S. Appl. No. 14/529,064, Non Final Office Action dated Apr. 18, 2016", 21 pgs.
"U.S. Appl. No. 14/529,064, Non Final Office Action dated Jul. 13, 2018", 38 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed May 25, 2018 to Final Office Action dated Jan. 25, 2018", 20 pgs.
"U.S. Appl. No. 14/529,064, Response filed Jul. 18, 2016 to Non Final Office Action dated Apr. 18, 2016", 20 pgs.
"U.S. Appl. No. 14/529,064, Response filed Sep. 6, 2017 to Non Final Office Action dated Apr. 6, 2017", 24 pgs.
"U.S. Appl. No. 14/529,064, Response filed Sep. 6, 2017 to Non Final Office Action dated Apr. 6, 2017", 19 pgs.
"U.S. Appl. No. 14/529,064, Response filed Oct. 12, 2015 to Final Office Action dated Aug. 11, 2015", 19 pgs.
"U.S. Appl. No. 14/529,064, Response filed Dec. 21, 2016 to Final Office Action dated Aug. 24, 2016", 17 pgs.
"U.S. Appl. No. 14/529,064, Restriction Requirement dated Feb. 2, 2015", 5 pgs.
"U.S. Appl. No. 14/539,391, Notice of Allowance dated Mar. 5, 2015", 17 pgs.
"U.S. Appl. No. 14/548,590, Advisory Action dated Apr. 19, 2018", 2 pgs.
"U.S. Appl. No. 14/548,590, Advisory Action dated Nov. 18, 2016", 3 pgs.
"U.S. Appl. No. 14/548,590, Appeal Brief Filed Apr. 20, 2018", 28 pgs.
"U.S. Appl. No. 14/548,590, Final Office Action dated Jul. 5, 2016", 16 pgs.
"U.S. Appl. No. 14/548,590, Final Office Action dated Jul. 18, 2017", 20 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.
"U.S. Appl. No. 14/548,590, Response filed May 9, 2017 to Non Final Office Action dated Jan. 9, 2017", 17 pgs.
"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Corrected Notice of Allowance dated Oct. 30, 2017", 2 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowability dated Nov. 29, 2017", 3 pgs.
"U.S. Appl. No. 14/578,271, Notice of Allowance dated Aug. 1, 2017", 5 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/594,410, Non Final Office Action dated Jan. 4, 2016", 10 pgs.
"U.S. Appl. No. 14/594,410, Notice of Allowance dated Aug. 2, 2016", 5 pgs.
"U.S. Appl. No. 14/594,410, Notice of Allowance dated Dec. 15, 2016", 6 pgs.
"U.S. Appl. No. 14/594,410, Response filed Jul. 1, 2016 to Non Final Office Action dated Jan. 4, 2016", 10 pgs.
"U.S. Appl. No. 14/612,692, Examiner Interview Summary dated Jan. 29, 2016", 5 pgs.
"U.S. Appl. No. 14/612,692, Examiner Interview Summary dated May 14, 2018", 3 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Examiner Interview Summary dated Nov. 13, 2017", 13 pgs.
"U.S. Appl. No. 14/612,692, Final Office Action dated Aug. 15, 2016", 18 pgs.
"U.S. Appl. No. 14/612,692, Final Office Action dated Aug. 25, 2017", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.

(56) References Cited

OTHER PUBLICATIONS

"U.S. Appl. No. 14/612,692, Non Final Office Action dated Jan. 9, 2018", 19 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Notice of Allowance dated Jul. 5, 2018", 11 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response Filed May 9, 2018 to Non Final Office Action dated Jan. 9, 2018", 15 pgs.
"U.S. Appl. No. 14/612,692, Response filed Nov. 14, 2016 to Final Office Action dated Aug. 15, 2016", 15 pgs.
"U.S. Appl. No. 14/612,692, Response Filed Nov. 22, 2017 to Final Office Action dated Aug. 25, 2017", 11 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/634,417, Examiner Interview Summary dated Aug. 7, 2017", 3 pgs.
"U.S. Appl. No. 14/634,417, Final Office Action dated Jan. 31, 2017", 27 pgs.
"U.S. Appl. No. 14/634,417, Non Final Office Action dated Jun. 8, 2017", 17 pgs.
"U.S. Appl. No. 14/634,417, Non Final Office Action dated Aug. 30, 2016", 23 pgs.
"U.S. Appl. No. 14/634,417, Notice of Allowance dated May 22, 2018", 9 pgs.
"U.S. Appl. No. 14/634,417, Notice of Allowance dated Oct. 25, 2017", 9 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Sep. 21, 2017 to Non Final Office Action dated Jun. 8, 2017", 16 pgs.
"U.S. Appl. No. 14/634,417, Response filed Nov. 30, 2016 to Non Final Office Action dated Aug. 30, 2016", 18 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Mar. 12, 2018", 7 pgs.
"U.S. Appl. No. 14/704,212, Non Final Office Action dated Jun. 16, 2017", 13 pgs.
"U.S. Appl. No. 14/704,212, Non Final Office Action dated Nov. 25, 2016", 13 pgs.
"U.S. Appl. No. 14/704,212, Non Final Office Action dated Dec. 4, 2015", 17 pgs.
"U.S. Appl. No. 14/704,212, Notice of Allowance dated Jul. 2, 2018", 7 pgs.
"U.S. Appl. No. 14/704,212, Response filed Feb. 27, 2017 to Non Final Office Action dated Nov. 25, 2016", 14 pgs.
"U.S. Appl. No. 14/704,212, Response filed Mar. 4, 2016 to Non Final Office Action dated Dec. 4, 2015", 11 pgs.
"U.S. Appl. No. 14/704,212, Response Filed Jun. 12, 2018 to Non Final Office Action dated Mar. 12, 2018", 9 pgs.
"U.S. Appl. No. 14/704,212, Response filed Oct. 17, 2016 to Final Office Action dated Jun. 17, 2016", 12 pgs.

"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance dated Mar. 29, 2017", 17 pgs.
"U.S. Appl. No. 14/841,987, Notice of Allowance dated Aug. 7, 2017", 8 pgs.
"U.S. Appl. No. 14/967,472, Corrected Notice of Allowability dated Mar. 18, 2019", 3 pgs.
"U.S. Appl. No. 14/967,472, Corrected Notice of Allowability dated Apr. 24, 2019", 3 pgs.
"U.S. Appl. No. 14/967,472, Final Office Action dated Mar. 10, 2017", 15 pgs.
"U.S. Appl. No. 14/967,472, Final Office Action dated Jun. 25, 2018", 14 pgs.
"U.S. Appl. No. 14/967,472, Non Final Office Action dated Jan. 12, 2018", 17 pgs.
"U.S. Appl. No. 14/967,472, Non Final Office Action dated Sep. 8, 2016", 11 pgs.
"U.S. Appl. No. 14/967,472, Notice of Allowance dated Jan. 24, 2019", 6 pgs.
"U.S. Appl. No. 14/967,472, Preliminary Amendment filed Dec. 15, 2015", 6 pgs.
"U.S. Appl. No. 14/967,472, Response filed Mar. 16, 2018 Non Final Office Action dated Jan. 12, 2018", 13 pgs.
"U.S. Appl. No. 14/967,472, Response filed Jun. 7, 2017 to Final Office Action dated Mar. 10, 2017", 12 pgs.
"U.S. Appl. No. 14/967,472, Response filed Sep. 21, 2018 to Final Office Action dated Jun. 25, 2018", 11 pgs.
"U.S. Appl. No. 14/967,472, Response filed Dec. 5, 2016 to Non Final Office Action dated Sep. 8, 2016", 11 pgs.
"U.S. Appl. No. 14/974,321, Examiner Interview Summary dated Dec. 5, 2017", 3 pgs.
"U.S. Appl. No. 14/974,321, Final Office Action dated Oct. 26, 2017", 16 pgs.
"U.S. Appl. No. 14/974,321, Non Final Office Action dated May 31, 2018", 14 pgs.
"U.S. Appl. No. 14/974,321, Non Final Office Action dated Jun. 29, 2017", 36 pgs.
"U.S. Appl. No. 14/974,321, Response filed Aug. 30, 2018 to Non Final Office Action dated May 31, 2018", 14 pgs.
"U.S. Appl. No. 14/974,321, Response filed Sep. 27, 2017 to Non Final Office Action dated Jun. 29, 2017", 13 pgs.
"U.S. Appl. No. 15/074,029, Advisory Action dated Oct. 11, 2018", 3 pgs.

(56) References Cited

OTHER PUBLICATIONS

"U.S. Appl. No. 15/074,029, Corrected Notice of Allowability dated Aug. 20, 2019", 10 pgs.
"U.S. Appl. No. 15/074,029, Final Office Action dated Jun. 28, 2018", 22 pgs.
"U.S. Appl. No. 15/074,029, Non Final Office Action dated Jan. 23, 2019", 19 pgs.
"U.S. Appl. No. 15/074,029, Non Final Office Action dated Nov. 30, 2017", 16 pgs.
"U.S. Appl. No. 15/074,029, Notice of Allowance dated Jun. 19, 2019", 14 pgs.
"U.S. Appl. No. 15/074,029, Response filed Feb. 28, 2018 to Non Final Office Action dated Nov. 30, 2017", 12 pgs.
"U.S. Appl. No. 15/074,029, Response filed Aug. 28, 2018 to Final Office Action dated Jun. 28, 2018", 21 pgs.
"U.S. Appl. No. 15/074,029, Response filed Apr. 23, 2019 to Non Final Office Action dated Jan. 23, 2019", 15 pgs.
"U.S. Appl. No. 15/137,608, Amendment and Response filed Jan. 25, 2019 to Non Final Office Action dated Nov. 2, 2018", 13 pgs.
"U.S. Appl. No. 15/137,608, Corrected Notice of Allowability dated Oct. 2, 2019", 3 pgs.
"U.S. Appl. No. 15/137,608, Final Office Action dated May 13, 2019", 10 pgs.
"U.S. Appl. No. 15/137,608, Non Final Office Action dated Nov. 2, 2018", 10 pgs.
"U.S. Appl. No. 15/137,608, Notice of Allowance dated Aug. 8, 2019", 7 pgs.
"U.S. Appl. No. 15/137,608, Preliminary Amendment filed Apr. 26, 2016", 6 pgs.
"U.S. Appl. No. 15/137,608, Response filed Jul. 12, 2019 to Final Office Action dated May 13, 2019", 10 pgs.
"U.S. Appl. No. 15/152,975, Examiner Interview Summary dated Feb. 4, 2019", 7 pgs.
"U.S. Appl. No. 15/152,975, Examiner Interview Summary dated May 14, 2018", 3 pgs.
"U.S. Appl. No. 15/152,975, Examiner Interview Summary dated Nov. 13, 2017", 13 pgs.
"U.S. Appl. No. 15/152,975, Final Office Action dated Jun. 30, 2017", 17 pgs.
"U.S. Appl. No. 15/152,975, Final Office Action dated Jul. 2, 2018", 19 pgs.
"U.S. Appl. No. 15/152,975, Non Final Office Action dated Jan. 10, 2018", 18 pgs.
"U.S. Appl. No. 15/152,975, Non Final Office Action dated Jan. 12, 2017", 36 pgs.
"U.S. Appl. No. 15/152,975, Non Final Office Action dated Sep. 28, 2018", 28 pgs.
"U.S. Appl. No. 15/152,975, Notice of Allowance dated May 17, 2019", 13 pgs.
"U.S. Appl. No. 15/152,975, Preliminary Amendment filed May 19, 2016", 8 pgs.
"U.S. Appl. No. 15/152,975, Response filed Jan. 28, 2019 to Non Final Office Action dated Sep. 28, 2018", 17 pgs.
"U.S. Appl. No. 15/152,975, Response Filed May 10, 2018 to Non Final Office Action dated Jan. 10, 2018", 13 pgs.
"U.S. Appl. No. 15/152,975, Response filed Jun. 12, 2017 to Non Final Office Action dated Jan. 12, 2017", 13 pgs.
"U.S. Appl. No. 15/152,975, Response filed Sep. 19, 2018 to Final Office Action dated Jul. 2, 2018", 14 pgs.
"U.S. Appl. No. 15/152,975, Response filed Nov. 30, 2017 to Final Office Action dated Jun. 30, 2017", 9 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,312, Advisory Action dated Aug. 27, 2019", 3 pgs.
"U.S. Appl. No. 15/224,312, Final Office Action dated Apr. 11, 2019", 15 pgs.
"U.S. Appl. No. 15/224,312, Final Office Action dated Apr. 20, 2018", 22 pgs.
"U.S. Appl. No. 15/224,312, Non Final Office Action dated Oct. 11, 2017", 29 pgs.
"U.S. Appl. No. 15/224,312, Non Final Office Action dated Oct. 22, 2018", 15 pgs.
"U.S. Appl. No. 15/224,312, Non Final Office Action dated Dec. 16, 2019", 14 pgs.
"U.S. Appl. No. 15/224,312, Preliminary Amendment filed Feb. 1, 2017", 11 pgs.
"U.S. Appl. No. 15/224,312, Response filed Feb. 22, 2019 to Non Final Office Action dated Oct. 22, 2018", 14 pgs.
"U.S. Appl. No. 15/224,312, Response filed Aug. 20, 2018 to Final Office Action dated Apr. 20, 2018", 16 pgs.
"U.S. Appl. No. 15/224,312, Response filed Oct. 11, 2019 to Advisory Action dated Aug. 27, 2019", 17 pgs.
"U.S. Appl. No. 15/224,312, Response filed Aug. 12, 2019 to Final Office Action dated Apr. 11, 2019", 14 pgs.
"U.S. Appl. No. 15/224,343, Amendment and Response filed Feb. 4, 2019 to Non Final Office Action dated Sep. 4, 2018", 18 pgs.
"U.S. Appl. No. 15/224,343, Final Office Action dated Mar. 22, 2019", 17 pgs.
"U.S. Appl. No. 15/224,343, Final Office Action dated Apr. 19, 2018", 20 pgs.
"U.S. Appl. No. 15/224,343, Non Final Office Action dated Sep. 4, 2018", 20 pgs.
"U.S. Appl. No. 15/224,343, Non Final Office Action dated Oct. 4, 2017", 26 pgs.
"U.S. Appl. No. 15/224,343, Non Final Office Action dated Nov. 12, 2019", 16 pgs.
"U.S. Appl. No. 15/224,343, Preliminary Amendment filed Jan. 31, 2017", 10 pgs.
"U.S. Appl. No. 15/224,343, Response filed Jul. 19, 2018 to Final Office Action dated Apr. 19, 2018", 16 pgs.
"U.S. Appl. No. 15/224,343, Response filed Mar. 5, 2018 to Non Final Office Action dated Oct. 4, 2017", 23 pgs.
"U.S. Appl. No. 15/224,343, Response filed Aug. 22, 2019 to Final Office Action dated Mar. 22, 2019", 16 pgs.
"U.S. Appl. No. 15/224,355, Examiner Interview Summary dated Oct. 25, 2017", 3 pgs.
"U.S. Appl. No. 15/224,355, Final Office Action dated Apr. 24, 2018", 20 pgs.
"U.S. Appl. No. 15/224,355, Final Office Action dated Aug. 9, 2019", 15 pgs.
"U.S. Appl. No. 15/224,355, Non Final Office Action dated Sep. 6, 2017", 30 pgs.
"U.S. Appl. No. 15/224,355, Non Final Office Action dated Dec. 20, 2018", 14 pgs.
"U.S. Appl. No. 15/224,355, Preliminary Amendment filed Apr. 3, 2017", 12 pgs.
"U.S. Appl. No. 15/224,355, Response filed Mar. 6, 2018 to Non Final Office Action dated Sep. 6, 2017", 25 pgs.
"U.S. Appl. No. 15/224,355, Response filed May 20, 2019 to Non Final Office Action dated Dec. 20, 2018", 13 pgs.
"U.S. Appl. No. 15/224,355, Response filed Sep. 24, 2018 to Final Office Action dated Apr. 24, 2018", 19 pgs.
"U.S. Appl. No. 15/224,355, Response filed Nov. 11, 2019 to Final Office Action dated Aug. 9, 2019", 14 pgs.

(56) References Cited

OTHER PUBLICATIONS

"U.S. Appl. No. 15/224,359, Final Office Action dated Apr. 2, 2018", 18 pgs.
"U.S. Appl. No. 15/224,359, Final Office Action dated Apr. 11, 2019", 15 pgs.
"U.S. Appl. No. 15/224,359, Non Final Office Action dated Jul. 20, 2017", 33 pgs.
"U.S. Appl. No. 15/224,359, Non Final Office Action dated Sep. 28, 2018", 15 pgs.
"U.S. Appl. No. 15/224,359, Non Final Office Action dated Dec. 10, 2019", 12 pgs.
"U.S. Appl. No. 15/224,359, Response filed Jan. 22, 2018 to Non Final Office Action dated Jul. 20, 2017", 13 pgs.
"U.S. Appl. No. 15/224,359, Response filed Feb. 28, 2019 to Non Final Office Action dated Aug. 28, 2018", 16 pgs.
"U.S. Appl. No. 15/224,359, Response filed Sep. 4, 2018 to Final Office Action dated Apr. 2, 2018", 14 pgs.
"U.S. Appl. No. 15/224,359, Response filed Sep. 11, 2019 to Final Office Action dated Apr. 11, 2019", 18 pgs.
"U.S. Appl. No. 15/224,365, Final Office Action dated Apr. 2, 2018", 19 pgs.
"U.S. Appl. No. 15/224,365, Final Office Action dated Aug. 23, 2019", 12 pgs.
"U.S. Appl. No. 15/224,365, Non Final Office Action dated Jan. 3, 2019", 11 pgs.
"U.S. Appl. No. 15/224,365, Non Final Office Action dated Aug. 8, 2017", 41 pgs.
"U.S. Appl. No. 15/224,365, Response filed Feb. 8, 2018 to Non Final Office Action dated Aug. 8, 2017", 14 pgs.
"U.S. Appl. No. 15/224,365, Response filed Oct. 2, 2018 to Final Office Action dated Apr. 2, 2018", 15 pgs.
"U.S. Appl. No. 15/224,365, Response filed Jun. 3, 2019 to Non-Final Office Action dated Jan. 3, 2019", 12 pgs.
"U.S. Appl. No. 15/224,372, Final Office Action dated Mar. 6, 2019", 17 pgs.
"U.S. Appl. No. 15/224,372, Final Office Action dated Apr. 3, 2018", 18 pgs.
"U.S. Appl. No. 15/224,372, Non Final Office Action dated Aug. 7, 2017", 40 pgs.
"U.S. Appl. No. 15/224,372, Non Final Office Action dated Sep. 14, 2018", 20 pgs.
"U.S. Appl. No. 15/224,372, Non Final Office Action dated Oct. 16, 2019", 14 pgs.
"U.S. Appl. No. 15/224,372, Preliminary Amendment filed May 5, 2017", 10 pgs.
"U.S. Appl. No. 15/224,372, Response filed Jan. 8, 2017 to Non Final Office Action dated Aug. 7, 2017", 22 pgs.
"U.S. Appl. No. 15/224,372, Response filed Jan. 16, 2019 to Non Final Office Action dated Sep. 14, 2018", 18 pgs.
"U.S. Appl. No. 15/224,372, Response filed Jul. 8, 2019 to Final Office Action dated Mar. 6, 2019", 14 pgs.
"U.S. Appl. No. 15/224,372, Response filed Aug. 3, 2018 to Final Office Action dated Apr. 3, 2018", 14 pgs.
"U.S. Appl. No. 15/224,377, Examiner Interview Summary dated Mar. 4, 2019", 5 pgs.
"U.S. Appl. No. 15/224,377, Final Office Action dated Jan. 2, 2018", 29 pgs.
"U.S. Appl. No. 15/224,377, Final Office Action dated Feb. 6, 2019", 14 pgs.
"U.S. Appl. No. 15/224,377, Non Final Office Action dated Jun. 15, 2018", 19 pgs.
"U.S. Appl. No. 15/224,377, Non Final Office Action dated Aug. 4, 2017", 41 pgs.
"U.S. Appl. No. 15/224,377, Non Final Office Action dated Oct. 15, 2019", 12 pgs.
"U.S. Appl. No. 15/224,377, Response filed Jun. 6, 2019 to Final Office Action dated Feb. 6, 2019", 10 pgs.
"U.S. Appl. No. 15/224,377, Response filed Dec. 17, 2018 to Non Final Office Action dated Jun. 15, 2018", 13 pgs.
"U.S. Appl. No. 15/224,377, Response filed Dec. 6, 2017 to Non Final Office Action dated Aug. 4, 2017", 22 pgs.
"U.S. Appl. No. 15/224,383, Examiner Interview Summary dated Aug. 15, 2018", 4 pgs.
"U.S. Appl. No. 15/224,383, Examiner Interview Summary dated Oct. 25, 2017", 3 pgs.
"U.S. Appl. No. 15/224,383, Final Office Action dated Jan. 14, 2019", 15 pgs.
"U.S. Appl. No. 15/224,383, Final Office Action dated Feb. 14, 2018", 25 pgs.
"U.S. Appl. No. 15/224,383, Non Final Office Action dated Jul. 5, 2018", 19 pgs.
"U.S. Appl. No. 15/224,383, Non Final Office Action dated Aug. 30, 2017", 26 pgs.
"U.S. Appl. No. 15/224,383, Non-Final Office Action dated Sep. 23, 2019", 13 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/224,383, Response filed May 14, 2019 to Final Office Action dated Jan. 14, 2019", 15 pgs.
"U.S. Appl. No. 15/224,383, Response filed Jun. 14, 2018 to Final Office Action dated Feb. 14, 2018", 14 pgs.
"U.S. Appl. No. 15/224,383, Response Filed Dec. 5, 2018 to Non Final Office Action dated Jul. 5, 2018", 16 pgs.
"U.S. Appl. No. 15/224,359, Preliminary Amendment filed Apr. 19, 2017", 8 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Examiner Interview Summary dated Aug. 13, 2018", 3 pgs.
"U.S. Appl. No. 15/298,806, Final Office Action dated Oct. 24, 2017", 15 pgs.
"U.S. Appl. No. 15/298,806, Non Final Office Action dated May 17, 2018", 16 pgs.
"U.S. Appl. No. 15/298,806, Non Final Office Action dated Jun. 12, 2017", 26 pgs.
"U.S. Appl. No. 15/298,806, Notice of Allowance dated Sep. 19, 2018", 5 pgs.
"U.S. Appl. No. 15/298,806, Preliminary Amendment filed Oct. 21, 2016", 8 pgs.
"U.S. Appl. No. 15/298,806, Response filed Jan. 9, 2018 to Final Office Action dated Oct. 24, 2017", 17 pgs.
"U.S. Appl. No. 15/298,806, Response filed Aug. 10, 2018 to Non Final Office Action dated May 17, 2018", 15 pgs.
"U.S. Appl. No. 15/298,806, Response filed Sep. 12, 2017 to Non Final Office Action dated Jun. 12, 2017", 12 pgs.
"U.S. Appl. No. 15/416,846, Notice of Allowance dated Jul. 19, 2017", 9 pgs.
"U.S. Appl. No. 15/416,846, Preliminary Amendment filed Feb. 18, 2017", 10 pgs.
"U.S. Appl. No. 15/424,184, Non Final Office Action dated Nov. 30, 2018", 22 pgs.
"U.S. Appl. No. 15/486,111, Corrected Notice of Allowance dated Sep. 7, 2017", 3 pgs.
"U.S. Appl. No. 15/486,111, Non Final Office Action dated May 9, 2017", 17 pgs.
"U.S. Appl. No. 15/486,111, Notice of Allowance dated Aug. 30, 2017", 5 pgs.
"U.S. Appl. No. 15/486,111, Response filed Aug. 9, 2017 to Non Final Office Action dated May 9, 2017", 11 pgs.
"U.S. Appl. No. 15/673,137, Non Final Office Action dated Oct. 5, 2018", 7 pgs.
"U.S. Appl. No. 15/702,511, 312 Amendment filed Jun. 26, 2019", 11 pgs.
"U.S. Appl. No. 15/702,511, Notice of Allowability dated Sep. 30, 2019", 2 pgs.
"U.S. Appl. No. 15/702,511, Notice of Allowance dated Mar. 26, 2019", 7 pgs.

(56) References Cited

OTHER PUBLICATIONS

"U.S. Appl. No. 15/702,511, Notice of Allowance dated Oct. 26, 2018", 7 pgs.
"U.S. Appl. No. 15/702,511, Preliminary Amendment filed Sep. 15, 2017", 13 pgs.
"U.S. Appl. No. 15/702,511, PTO Response to Rule 312 Communication dated Aug. 13, 2019", 2 pgs.
"U.S. Appl. No. 15/729,582, Corrected Notice of Allowability dated Oct. 2, 2019", 3 pgs.
"U.S. Appl. No. 15/729,582, Corrected Notice of Allowability dated Oct. 30, 2019", 3 pgs.
"U.S. Appl. No. 15/729,582, Final Office Action dated Dec. 13, 2018", 14 pgs.
"U.S. Appl. No. 15/729,582, Non Final Office Action dated May 25, 2018", 14 pgs.
"U.S. Appl. No. 15/729,582, Notice of Allowance dated Jul. 22, 2019", 9 pgs.
"U.S. Appl. No. 15/729,582, Response filed May 13, 2019 to Final Office Action dated Dec. 13, 2018", 9 pgs.
"U.S. Appl. No. 15/787,467, Corrected Notice of Allowability dated Sep. 24, 2018", 2 pgs.
"U.S. Appl. No. 15/787,467, Non Final Office Action dated Apr. 18, 2018", 17 pgs.
"U.S. Appl. No. 15/787,467, Notice of Allowance dated Aug. 31, 2018", 8 pgs.
"U.S. Appl. No. 15/787,467, Preliminary Amendment filed Oct. 26, 2017", 11 pgs.
"U.S. Appl. No. 15/787,467, Response filed Jul. 18, 2018 to Non Final Office Action dated Apr. 18, 2018", 12 pgs.
"U.S. Appl. No. 15/835,100, Non Final Office Action dated Jan. 23, 2018", 18 pgs.
"U.S. Appl. No. 15/835,100, Notice of Allowance dated May 22, 2018", 5 pgs.
"U.S. Appl. No. 15/835,100, Response Filed Apr. 23, 2018 to Non Final Office Action dated Jan. 23, 2018", 11 pgs.
"U.S. Appl. No. 15/946,990, Final Office Action dated May 9, 2019", 11 pgs.
"U.S. Appl. No. 15/946,990, Non Final Office Action dated Dec. 3, 2018", 10 pgs.
"U.S. Appl. No. 15/946,990, Notice of Allowance dated Sep. 24, 2019", 5 pgs.
"U.S. Appl. No. 15/946,990, Response filed Feb. 20, 2019 to Non Final Office Action dated Dec. 3, 2018", 11 pgs.
"U.S. Appl. No. 15/946,990, Response filed Jul. 9, 2019 to Final Office Action dated May 9, 2019", 12 pgs.
"U.S. Appl. No. 15/947,350, Non Final Office Action dated Dec. 13, 2019", 20 pgs.
"U.S. Appl. No. 16/000,657, Preliminary Amendment filed Jun. 6, 2018", 8 pgs.
"U.S. Appl. No. 16/105,687, Non Final Office Action dated Sep. 14, 2018", 11 pgs.
"U.S. Appl. No. 16/204,886, Corrected Notice of Allowability dated Jul. 15, 2019", 2 pgs.
"U.S. Appl. No. 16/204,886, Corrected Notice of Allowability dated Aug. 6, 2019", 2 pgs.
"U.S. Appl. No. 16/204,886, Corrected Notice of Allowability dated Sep. 10, 2019", 2 pgs.
"U.S. Appl. No. 16/204,886, Non Final Office Action dated Jan. 4, 2019", 8 pgs.
"U.S. Appl. No. 16/204,886, Notice of Allowance dated May 15, 2019", 9 pgs.
"U.S. Appl. No. 16/204,886, Response filed Apr. 2, 2019 to Non Final Office Action dated Jan. 4, 2019", 8 pgs.
"U.S. Appl. No. 16/219,577, Non Final Office Action dated Oct. 29, 2019", 7 pgs.
"U.S. Appl. No. 16/219,577, Response filed Oct. 3, 2019 to Restriction Requirement dated Aug. 7, 2019", 6 pgs.
"U.S. Appl. No. 16/219,577, Response filed Dec. 5, 2019 to Non Final Office Action dated Oct. 29, 2019", 6 pgs.
"U.S. Appl. No. 16/219,577, Restriction Requirement dated Aug. 7, 2019", 6 pgs.
"U.S. Appl. No. 16/376,598, Non Final Office Action dated Jul. 25, 2019", 7 pgs.
"U.S. Appl. No. 16/376,598, Notice of Allowance dated Oct. 18, 2019", 5 pgs.
"U.S. Appl. No. 16/376,598, Response filed Oct. 7, 2019 to Non-Final Office Action dated Jul. 25, 2019", 2 pgs.
"U.S. Appl. No. 16/511,834, Non-Final Office Action dated Aug. 20, 2019", 11 pgs.
"U.S. Appl. No. 16/511,834, Notice of Allowance dated Oct. 23, 2019", 8 pgs.
"U.S. Appl. No. 16/511,834, Response filed Oct. 7, 2019 to Non-Final Office Action dated Aug. 20, 2019", 3 pgs.
"U.S. Appl. No. 16/662,956, Preliminary Amendment filed Oct. 24, 2019", 8 pgs.
"BlogStomp", StompSoftware, [Online] Retrieved from the Internet: <URL: http://stompsoftware.com/blogstomp>, (accessed May 24, 2017), 12 pgs.
"Canadian Application Serial No. 2,894,332 Response filed Jan. 24, 2017 to Office Action dated Aug. 16, 2016", 15 pgs.
"Canadian Application Serial No. 2,894,332, Office Action dated Aug. 16, 2016", 4 pgs.
"Canadian Application Serial No. 2,894,332, Request for Reinstatement filed Jun. 11, 2018", w/ Amended Claims, 17 pgs.
"Canadian Application Serial No. 2,910,158, Office Action dated Jun. 6, 2018", 5 pgs.
"Canadian Application Serial No. 2,910,158, Office Action dated Dec. 15, 2016", 5 pgs.
"Canadian Application Serial No. 2,910,158, Response filed Dec. 6, 2018 to Office Action dated Jun. 6, 2018", w/ English Claims, 18 pgs.
"Canadian Application Serial No. 2,910,158, Response filed Apr. 11, 2017 to Office Action dated Dec. 15, 2016", 21 pgs.
"Canadian Application Serial No. 3,027,981, Office Action dated Dec. 5, 2019", 4 pgs.
"Chinese Application Serial No. 201580031616.8, Office Action dated Jul. 2, 2018", w/ English translation, 8 pgs.
"Chinese Application Serial No. 201580031616.8, Office Action dated Oct. 9, 2017", w/ English Translation, 18 pgs.
"Chinese Application Serial No. 201580031616.8, Response filed Feb. 26, 2018 to Office Action dated Oct. 9, 2017", w/ English Translation, 8 pgs.
"Chinese Application Serial No. 201580076228.1, Office Action dated Jul. 19, 2018", w/ English translation, 19 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Demystifying Location Data Accuracy", Mobile Marketing Association, (Nov. 2015), 18 pgs.
"European Application Serial No. 14804343.3, Extended European Search Report dated Sep. 29, 2016", 12 pgs.
"European Application Serial No. 15733026.7, Communication Pursuant to Article 94(3) EPC dated Jul. 28, 2017", 6 pgs.
"European Application Serial No. 15733026.7, Decision to Refuse a European Patent Application dated Nov. 18, 2019", 20 pgs.
"European Application Serial No. 15733026.7, Response filed Jan. 30, 2018 to Communication Pursuant to Article 94(3) EPC dated Jul. 28, 2017", w/ Amended Claims, 37 pgs.
"European Application Serial No. 15733026.7, Response filed Aug. 9, 2019 to Summons to Attend Oral Proceedings mailed Jan. 10, 2019", w/ English Claims, 19 pgs.
"European Application Serial No. 15733026.7, Summons to Attend Oral Proceedings mailed Jan. 10, 2019", 7 pgs.
"European Application Serial No. 15782165.3, Communication Pursuant to Article 94(3) EPC dated Sep. 14, 2018", 7 pgs.
"European Application Serial No. 15782165.3, Response filed Oct. 17, 2017 to Communication pursuant to Rules 161(1) and 162 EPC dated May 10, 2017", 15 pgs.

(56) References Cited

OTHER PUBLICATIONS

"European Application Serial No. 15787854.7, Response filed Dec. 11, 2017 to Communication Pursuant to Rules 161(1) and 162 EPC dated Jun. 1, 2017", 16 pgs.
"European Application Serial No. 15870861.0, Communication Pursuant to Article 94(3) EPC dated Jul. 12, 2018", 5 pgs.
"European Application Serial No. 15870861.0, Extended European Search Report dated Jul. 3, 2018", 4 pgs.
"European Application Serial No. 15870861.0, Response filed Aug. 9, 2017 to Communication Pursuant to Rules 161(2) and 162 EPC dated Aug. 4, 2017", 10 pgs.
"European Application Serial No. 15870861.0, Response filed Nov. 14, 2018 to Communication Pursuant to Article 94(3) EPC dated Jul. 12, 2018", w/ English Claims, 27 pgs.
"European Application Serial No. 15870874.3, Extended European Search Report dated Nov. 29, 2017", 7 pgs.
"European Application Serial No. 16716090.2, Response filed May 21, 2018 to Communication pursuant to Rules 161(1) and 162 EPC dated Nov. 10, 2017", w/ English Claims, 89 pgs.
"How Snaps Are Stored And Deleted", Snapchat, [Online] Retrieved from the Internet: <URL: https://www.snap.com/en-US/news/post/how-snaps-are-stored-and-deleted/>, (May 9, 2013), 2 pgs.
"IAB Platform Status Report: A Mobile Advertising Review", Interactive Advertising Bureau, (Jul. 2008), 24 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.
"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Preliminary Report on Patentability dated Jun. 29, 2017", 7 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2016/066976, International Preliminary Report on Patentability dated Jun. 28, 2018", 9 pgs.
"International Application Serial No. PCT/US2016/066976, International Search Report dated May 17, 2017", 7 pgs.
"International Application Serial No. PCT/US2016/066976, Invitation to Pay Add'l Fees and Partial Search Rpt dated Mar. 6, 2017", 8 pgs.
"International Application Serial No. PCT/US2016/066976, Written Opinion dated May 17, 2017", 7 pgs.
"International Application Serial No. PCT/US2018/016723, International Search Report dated Apr. 5, 2018", 2 pgs.
"International Application Serial No. PCT/US2018/016723, Written Opinion dated Apr. 5, 2018", 17 pgs.
"International Application Serial No. PCT/US2018/024093, International Search Report dated Jul. 19, 2018", 2 pgs.
"International Application Serial No. PCT/US2018/024093, Written Opinion dated Jul. 19, 2018", 5 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"iVisit Mobile: Getting Started", iVisit, [Online] Retrieved from the Internet: <URL: http://web.archive.org/web/20140830174355/http://ivisit.com/support_mobile>, (Dec. 4, 2013), 16 pgs.
"Korean Application Serial No. 10-2017-7001104, Response filed Jul. 25, 2017 to Office Action dated Jun. 26, 2017", w/ Translation of Claims, 20 pgs.
"Korean Application Serial No. 10-2017-7014135, Final Office Action dated Feb. 28, 2019", w/ English Translation, 7 pgs.
"Korean Application Serial No. 10-2017-7014135, Notice of Preliminary Rejection dated Apr. 19, 2019", w/ English Translation, 14 pgs.
"Korean Application Serial No. 10-2017-7014135, Notice of Preliminary Rejection dated Jul. 20, 2018", w/ English Translation, 13 pgs.
"Korean Application Serial No. 10-2017-7014135, Response filed Mar. 29, 2019 to Final Office Action dated Feb. 28, 19", w/ English Claims, 14 pgs.
"Korean Application Serial No. 10-2017-7014135, Response filed Jun. 19, 2019 to Notice of Preliminary Rejection dated Apr. 19, 2019", w/ English Claims, 16 pgs.
"Korean Application Serial No. 10-2017-7014135, Response filed Sep. 17, 2018 to Notice of Preliminary Rejection dated Jul. 20, 2018", w/ English Claims, 16 pgs.
"Korean Application Serial No. 10-2017-7020217, Final Office Action dated Jan. 31, 2018", w/ English Translation, 10 pgs.
"Korean Application Serial No. 10-2017-7020217, Office Action dated Sep. 15, 2017", w/ English Translation, 11 pgs.
"Korean Application Serial No. 10-2017-7020217, Response filed Feb. 23, 2018 to Final Office Action dated Jan. 31, 2018", w/ English Translation, 13 pgs.
"Korean Application Serial No. 10-2017-7020217, Response filed Nov. 2, 2017 to Office Action dated Sep. 15, 2017", w/ English Translation, 17 pgs.
"Korean Application Serial No. 10-2017-7035789, Notice of Preliminary Rejection dated Nov. 12, 2018", w/ English Translation, 12 pgs.

(56) References Cited

OTHER PUBLICATIONS

"Korean Application Serial No. 10-2018-7002127, Notice of Preliminary Rejection dated Apr. 10, 2018", w/ English Translation, 4 pgs.

"Korean Application Serial No. 10-2018-7002127, Response filed May 16, 2018 to Notice of Preliminary Rejection dated Apr. 10, 2018", w/ English Claims, 14 pqs.

"Korean Application Serial No. 10-2018-7016881, Notice of Preliminary Rejection dated Oct. 19, 2018", w/ English translation, 9 pgs.

"Korean Application Serial No. 10-2018-7037070, Notice of Final Rejection dated Sep. 30, 2019", w/ English Translation, 5 pgs.

"Korean Application Serial No. 10-2018-7037070, Notice of Final Rejection dated Nov. 25, 2019", w/ English Translation, 5 pgs.

"Korean Application Serial No. 10-2018-7037070, Notice of Preliminary Rejection dated Mar. 20, 2019", w/ English Translation, 10 pgs.

"Korean Application Serial No. 10-2018-703/070, Response filed Oct. 23, 2019 to Notice of Final Rejection dated Sep. 30, 2019", w/ English Claims, 16 pgs.

"Korean Application Serial No. 10-2018-7037070, Response filed May 14, 2019 to Notice of Preliminary Rejection dated Mar. 20, 2019", w/ English Translation, 10 pgs.

"Korean Office Action Application Serial No. 10-2017-7001104, Office Action dated Jun. 26, 2017", w/ English Translation, 12 pgs.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

"To Err is Human. To Self Destruct Messages, There is iDelete for iOS", The Apple Google, [Online], Retrieved from the Internet on Mar. 21, 2018: <http://theapplegoogle.com/2013/04/err-human-destruct-messages-idelete-ios/>, (2013), 2 pgs.

Carr, Dale, "Mobile Ad Targeting: A Labor of Love", Ad Week, [Online] Retrieved from the Internet on Feb. 11, 2019: <URL: https://www.adweek.com/digital/mobile-ad-targeting-a-labor-of-love/>, (Feb. 12, 2016), 7 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Castelluccia, Claude, et al., "EphPub: Toward robust Ephemeral Publishing", 19th IEEE International Conference on Network Protocols (ICNP), (Oct. 17, 2011), 18 pgs.

Chen, Datong, et al., "Protecting Personal Identification in Video", Protecting Privacy in Video Surveillance, Springer-Verlag London Ltd., (2009), 115-128.

Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.

Fajman, "An Extensible Message Format for Message Disposition Notifications", Request for Comments: 2298, National Institutes of Health, (Mar. 1998), 28 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Kumar, S, "Optimization Issues in Web and Mobile Advertising", Chapter 2—Pricing Models in Web Advertising, SpringerBriefs in Operations Management, (2016), 6 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Quercia, Daniele, et al., "Mobile Phones and Outdoor Advertising: Measurable Advertising", IEEE Persuasive Computing, (2011), 9 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Simonite, Tom, "Mobile Data: A Gold Mine for Telcos", MIT Technology Review, (May 27, 2010), 6 pgs.

Trice, Andrew, "My Favorite New Feature: Multi-Clip Sync in Premiere Pro CC", [Online], Retrieved from the Internet: <URL: http://www.tricedesigns.com/2013/06/18/my-favorite-new-feature-multi-cam-synch-in-premiere-pro-cc/, (Jun. 18, 2013), 5 pgs.

Tripathi, Rohit, "Watermark Images in PHP And Save File on Sewer", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptit>, (Dec. 13, 2005), 2 pgs.

"U.S. Appl. No. 14/548,590, Appeal Decision dated Mar. 26, 2020", 13 pgs.

"U.S. Appl. No. 14/974,321, Corrected Notice of Allowability dated Feb. 13, 2019", 6 pgs.

"U.S. Appl. No. 14/974,321, Corrected Notice of Allowability dated Apr. 19, 2019", 6 pgs.

"U.S. Appl. No. 14/974,321, Corrected Notice of Allowability dated Jun. 12, 2019", 6 pgs.

"U.S. Appl. No. 14/974,321, Notice of Allowance dated Jan. 3, 2019", 9 pgs.

"U.S. Appl. No. 15/074,029, Corrected Notice of Allowability dated Feb. 5, 2020", 4 pgs.

"U.S. Appl. No. 15/224,312, Final Office Action dated May 1, 2020", 18 pgs.

(56) References Cited

OTHER PUBLICATIONS

"U.S. Appl. No. 15/224,312, Response filed Apr. 16, 2020 to Non Final Office Action dated Dec. 16, 2019", 14 pgs.
"U.S. Appl. No. 15/224,343, Final Office Action dated Apr. 7, 2020", 16 pgs.
"U.S. Appl. No. 15/224,343, Response filed Mar. 2, 2020 to Non Final Office Action dated Nov. 12, 2019", 17 pgs.
"U.S. Appl. No. 15/224,343, Response filed Jun. 3, 2020 to Final Office Action dated Apr. 7, 2020", 12 pgs.
"U.S. Appl. No. 15/224,355, Final Office Action dated May 1, 2020", 15 pgs.
"U.S. Appl. No. 15/224,355, Non Final Office Action dated Jan. 22, 2020", 13 pgs.
"U.S. Appl. No. 15/224,355, Response filed Apr. 22, 2020 to Non Final Office Action dated Jan. 22, 2020", 13 pgs.
"U.S. Appl. No. 15/224,359, Final Office Action dated May 1, 2020", 13 pgs.
"U.S. Appl. No. 15/224,359, Response filed Apr. 10, 2020 to Non Final Office Action dated Dec. 10, 2019", 11 pgs.
"U.S. Appl. No. 15/224,365, Non Final Office Action dated Mar. 13, 2020", 9 pgs.
"U.S. Appl. No. 15/224,365, Response filed Jan. 23, 2020 to Final Office Action dated Aug. 23, 2019", 13 pgs.
"U.S. Appl. No. 15/224,365, Response filed Jun. 15, 2020 to Non Final Office Action dated Mar. 13, 2020", 12 pgs.
"U.S. Appl. No. 15/224,372, Final Office Action dated May 4, 2020", 15 pgs.
"U.S. Appl. No. 15/224,372, Response filed Apr. 16, 2020 to Non Final Office Action dated Oct. 16, 2019", 14 pgs.
"U.S. Appl. No. 15/224,377, Final Office Action dated May 5, 2020", 15 pgs.
"U.S. Appl. No. 15/224,377, Response filed Apr. 15, 2020 to Non Final Office Action dated Oct. 15, 2019", 13 pgs.
"U.S. Appl. No. 15/224,383, Notice of Allowance dated Feb. 27, 2020", 7 pgs.
"U.S. Appl. No. 15/224,383, Response filed Jan. 23, 2020 to Non Final Office Action dated Sep. 23, 2019", 14 pgs.
"U.S. Appl. No. 15/424,184, Examiner Interview Summary dated Jan. 10, 2019", 3 pgs.
"U.S. Appl. No. 15/424,184, Examiner Interview Summary dated Jul. 30, 2019", 2 pgs.
"U.S. Appl. No. 15/424,184, Final Office Action dated Jan. 29, 2019", 14 pgs.
"U.S. Appl. No. 15/424,184, Final Office Action dated Mar. 9, 2020", 19 pgs.
"U.S. Appl. No. 15/424,184, Final Office Action dated Sep. 9, 2019", 13 pgs.
"U.S. Appl. No. 15/424,184, Non Final Office Action dated May 21, 2019", 16 pgs.
"U.S. Appl. No. 15/424,184, Non Final Office Action dated Dec. 2, 2019", 16 pgs.
"U.S. Appl. No. 15/424,184, Response filed Mar. 2, 2020 to Non Final Office Action dated Dec. 2, 2019", 11 pgs.
"U.S. Appl. No. 15/424,184, Response filed Aug. 21, 2019 to Non Final Office Action dated May 21, 2019", 12 pgs.
"U.S. Appl. No. 15/424,184, Response filed Nov. 11, 2019 to Final Office Action dated Sep. 9, 2019", 12 pgs.
"U.S. Appl. No. 15/424,184, Response filed Apr. 29, 2019 to Final Office Action dated Jan. 29, 2019", 11 pgs.
"U.S. Appl. No. 15/424,184k, Response filed Jan. 4, 2019 to Non Final Office Action dated Nov. 30, 2018", 17 pgs.
"U.S. Appl. No. 15/470,004, Examiner Interview Summary dated Sep. 12, 2019", 3 pgs.
"U.S. Appl. No. 15/470,004, Final Office Action dated May 20, 2019", 9 pgs.
"U.S. Appl. No. 15/470,004, Non Final Office Action dated Jan. 31, 2019", 9 pgs.
"U.S. Appl. No. 15/470,004, Notice of Allowance dated Oct. 22, 2019", 10 pgs.
"U.S. Appl. No. 15/470,004, Response filed Apr. 29, 2019 to Non Final Office Action dated Jan. 31, 2019", 12 pgs.
"U.S. Appl. No. 15/470,004, Response filed Sep. 9, 2019 to Final Office Action dated May 20, 2019", 13 pgs.
"U.S. Appl. No. 15/470,025, Final Office Action dated May 20, 2019", 10 pgs.
"U.S. Appl. No. 15/470,025, Non Final Office Action dated Jan. 30, 2019", 10 pgs.
"U.S. Appl. No. 15/470,025, Notice of Allowance dated Oct. 22, 2019", 10 pgs.
"U.S. Appl. No. 15/470,025, Response filed Apr. 24, 2019 to Non Final Office Action dated Jan. 30, 2019", 13 pgs.
"U.S. Appl. No. 15/470,025, Response filed Sep. 12, 2019 to Final Office Action dated May 20, 2019", 14 pgs.
"U.S. Appl. No. 15/474,821, Advisory Action dated Dec. 19, 2019", 3 pgs.
"U.S. Appl. No. 15/474,821, Final Office Action dated Sep. 3, 2019", 19 pgs.
"U.S. Appl. No. 15/474,821, Non Final Office Action dated Jan. 25, 2019", 17 pgs.
"U.S. Appl. No. 15/474,821, Response filed Apr. 25, 2019 to Non Final Office Action dated Jan. 25, 2019", 16 pgs.
"U.S. Appl. No. 15/474,821, Response filed on Dec. 2, 2019 to Final Office Action dated Sep. 3, 2019", 10 pgs.
"U.S. Appl. No. 15/673,137, Final Office Action dated Jan. 27, 2020", 11 pgs.
"U.S. Appl. No. 15/673,137, Final Office Action dated May 16, 2019", 8 pgs.
"U.S. Appl. No. 15/673,137, Non Final Office Action dated Aug. 30, 2019", 10 pgs.
"U.S. Appl. No. 15/673,137, Response filed Jan. 31, 2019 to Non Final Office Action dated Oct. 5, 2018", 10 pgs.
"U.S. Appl. No. 15/673,137, Response filed Oct. 18, 2019 to Non-Final Office Action dated Aug. 30, 2019", 12 pgs.
"U.S. Appl. No. 15/673,137, Response filed Aug. 1, 2019 to Final Office Action dated May 16, 2019", 10 pgs.
"U.S. Appl. No. 15/729,582, Corrected Notice of Allowability dated Dec. 18, 2019", 3 pgs.
"U.S. Appl. No. 15/837,935, Notice of Allowance dated Nov. 25, 2019", 18 pgs.
"U.S. Appl. No. 15/947,350, Final Office Action dated May 4, 2020", 12 pgs.
"U.S. Appl. No. 15/947,350, Response filed Apr. 13, 2020 to Non Final Office Action dated Dec. 13, 2019", 12 pgs.
"U.S. Appl. No. 16/000,657, Examiner Interview Summary dated Jun. 12, 2020", 4 pgs.
"U.S. Appl. No. 16/000,657, Non Final Office Action dated Mar. 6, 2020", 30 pgs.
"U.S. Appl. No. 16/105,687, Notice of Allowance dated Feb. 25, 2019", 8 pgs.
"U.S. Appl. No. 16/105,687, Response filed Dec. 14, 2018 to Non Final Office Action dated Sep. 14, 2018", 12 pgs.
"U.S. Appl. No. 16/155,782, Final Office Action dated Jan. 3, 2020", 14 pgs.
"U.S. Appl. No. 16/155,782, Non Final Office Action dated Jul. 10, 2019", 7 pgs.
"U.S. Appl. No. 16/155,782, Response filed Oct. 8, 2019 to Non-Final Office Action dated Jul. 10, 2019", 10 pgs.
"U.S. Appl. No. 16/212,313, Non Final Office Action dated Feb. 4, 2020", 20 pgs.
"U.S. Appl. No. 16/212,313, Non Final Office Action dated Aug. 30, 2019", 18 pgs.
"U.S. Appl. No. 16/212,313, Preliminary Amendment filed Dec. 12, 2018", 6 pgs.
"U.S. Appl. No. 16/212,313, Response filed Dec. 2, 2019 to Non Final Office Action dated Aug. 30, 2019", 11 pgs.
"U.S. Appl. No. 16/219,577, Notice of Allowance dated Jan. 15, 2020", 7 pgs.
"U.S. Appl. No. 16/376,598, Notice of Allowability dated Jan. 23, 2020", 2 pgs.
"U.S. Appl. No. 16/428,210, Preliminary Amendment filed Aug. 8, 2019", 8 pgs.

(56) References Cited

OTHER PUBLICATIONS

"U.S. Appl. No. 16/511,834, Corrected Notice of Allowability dated Jan. 27, 2020", 2 pgs.
"U.S. Appl. No. 16/529,461, Non Final Office Action dated May 21, 2020", 19 pgs.
"U.S. Appl. No. 16/541,919, Non Final Office Action dated Apr. 14, 2020", 18 pgs.
"U.S. Appl. No. 16/541,919, Response filed Jun. 12, 2020 to Non Final Office Action dated Apr. 14, 2020", 8 pgs.
"U.S. Appl. No. 16/667,814, Preliminary Amendment filed Apr. 20, 2020", 6 pgs.
"U.S. Appl. No. 16/703,526, Notice of Allowance dated Jun. 19, 2020", 10 pgs.
"U.S. Appl. No. 16/709,092, Corrected Notice of Allowability dated Jun. 1, 2020", 2 pgs.
"U.S. Appl. No. 16/709,092, Notice of Allowance dated Apr. 9, 2020", 9 pgs.
"U.S. Appl. No. 16/808,101, Preliminary Amendment filed Mar. 10, 2020", 8 pgs.
"Canadian Application Serial No. 3,027,981, Response filed Mar. 31, 2020 to Office Action dated Dec. 5, 2019", 12 pgs.
"Chinese Application Serial No. 201580070593.1, Office Action dated Apr. 8, 2020", w/o English Translation, 6 pgs.
"Chinese Application Serial No. 201580076228.1, Decision of Rejection dated Jul. 9, 2019", w/ English Translation, 19 pgs.
"Chinese Application Serial No. 201580076228.1, Office Action dated Feb. 12, 2019", w/ English Translation, 18 pgs.
"Chinese Application Serial No. 201580076228.1, Response filed Apr. 11, 2019 to Office Action dated Feb. 12, 2019", w/ English Claims, 12 pgs.
"Chinese Application Serial No. 201580076228.1, Response filed Oct. 11, 2019 to Decision of Rejection dated Jul. 9, 2019", w/ English Claims, 13 pgs.
"Chinese Application Serial No. 201580076228.1, Response filed Nov. 26, 2018 to Office Action dated Jul. 19, 2018", w/ English Claims, 16 pgs.
"Chinese Application Serial No. 201680027177.8, Office Action dated Oct. 28, 2019", W/English Translation, 15 pgs.
"Chinese Application Serial No. 201680027177.8, Response filed Mar. 5, 2020 to Office Action dated Oct. 28, 2019", w/ English Claims, 11 pgs.
"Chinese Application Serial No. 201680035076.5, Office Action dated Sep. 4, 2019", w/ English Translation, 16 pgs.
"Chinese Application Serial No. 201680035076.5, Response filed Dec. 26, 2019 to Office Action dated Sep. 4, 2019", w/ English Claims, 15 pgs.
"Connecting To Your Customers In the Triangle and Beyond", Newsobserver.com, (2013), 16 pgs.
"European Application Serial No. 15782165.3, Decision to Refuse a European Patent Application dated Mar. 19, 2020", 23 pgs.
"European Application Serial No. 15782165.3, Response filed Jan. 10, 2020 to Summons to Attend Oral Proceedings mailed Sep. 18, 2019", 18 pgs.
"European Application Serial No. 15782165.3, Response filed Jan. 24, 2019 to Communication Pursuant to Article 94(3) EPC dated Sep. 14, 2018", w/ English Claims, 54 pgs.
"European Application Serial No. 15782165.3, Summons to Attend Oral Proceedings mailed Sep. 18, 2019", 6 pgs.
"European Application Serial No. 15787854.7, Communication Pursuant to Article 94(3) EPC dated Feb. 12, 2020", 7 pgs.
"European Application Serial No. 15870861.0, Response filed May 31, 2019 to Summons to Attend Oral Proceedings mailed Dec. 21, 2018", English Claims, 23 pgs.
"European Application Serial No. 15870861.0, Summons to Attend Oral Proceedings mailed Dec. 21, 2018", 5 pgs.
"European Application Serial No. 16716090.2, Communication Pursuant to Article 94(3) EPC dated Jan. 15, 2020", 6 pgs.
"European Application Serial No. 16829020.3, Response filed Jan. 29, 2019 to Communication Pursuant to Rules 161(1) and 162 EPC dated Jul. 25, 2018", w/ English Claims, 17 pgs.
"European Application Serial No. 18747246.9, Extended European Search Report dated Nov. 7, 2019", 7 pgs.
"Geofencing and the event industry", Goodbarber Blog, [Online] Retrieved from the internet by the examiner on May 16, 2019: <URL: https://www.goodbarber.com/blog/geofencing-and-the-event-industry-a699/>, (Nov. 9, 2015), 7 pgs.
"International Application Serial No. PCT/US2018/016723, International Preliminary Report on Patentability dated Aug. 15, 2019", 19 pgs.
"International Application Serial No. PCT/US2018/024093, International Preliminary Report on Patentability dated Oct. 10, 2019", 7 pgs.
"Korean Application Serial No. 10-2017-7029861, Notice of Preliminary Rejection dated Jan. 17, 2019", w/ English Translation, 9 pgs.
"Korean Application Serial No. 10-2017-7029861, Response filed Mar. 15, 2019 to Notice of Preliminary Rejection dated Jan. 17, 2019", w/ English Claims, 20 pgs.
"Korean Application Serial No. 10-2017-7035789, Response filed Jan. 10, 2019 to Notice of Preliminary Rejection dated Nov. 12, 2018", w/ English Claims, 23 pgs.
"Korean Application Serial No. 10-2018-7016881, Response filed Nov. 30, 2018 to Notice of Preliminary Rejection dated Oct. 19, 2018", w/ English Claims, 27 pgs.
"Korean Application Serial No. 10-2019-7030235, Notice of Preliminary Rejection dated Nov. 28, 2019", w/ English Translation, 10 pgs.
"Korean Application Serial No. 10-2019-7030235, Response filed Jan. 28, 2020 to Notice of Preliminary Rejection dated Nov. 28, 2019", w/ English Claims, 12 pgs.
"Korean Application Serial No. 10-2019-7036962, Notice of Preliminary Rejection dated Jan. 3, 2020", w/ English Translation, 11 pgs.
"Korean Application Serial No. 10-2019-7036962, Response filed Feb. 17, 2020 to Notice of Preliminary Rejection dated Jan. 3, 2020", English Claims, 25 pgs.
"Korean Application Serial No. 10-2019-7038483, Notice of Preliminary Rejection dated Jan. 31, 2020", w/ English translation, 4 pgs.
"Korean Application Serial No. 10-2019-7038483, Response filed Mar. 10, 2020 to Notice of Preliminary Rejection dated Jan. 31, 2020", w/ English Claims, 19 pgs.
"Mobile Location User Cases and Case Studies", Interactive Advertising Bureau, (Mar. 2014), 25 pgs.
"Surprise!", [Online] Retrieved from the Internet: <URL: https://www.snap.com/en-US/news/post/surprise>, (Oct. 3, 2013), 1 pg.
"WIPO; International Preliminary Report; WO201776739", (dated Sep. 10, 2018), 5 pgs.
"WIPO; Search Strategy; WO201776739", (Dec. 10, 2017), 6 pgs.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear, (Oct. 3, 2013), 5 pgs.
Isaac, Mike, "New Mobile App Vyclone Aims to Remix Social Video From Every Angle", All Things D, The Wallstreet Journal, [Online] Retrieved from the Internet: <URL: http://allthingsd.com/20120718/new-mobile-app-vyclone-aims-to-remix-social-video-from-every-angle/>, (Jul. 18, 2012), 4 pgs.
Naylor, Joseph, "Geo-Precise Targeting: It's time to Get off the Fence", Be In The Know Blog, [Online] Retrieved from the Internet on May 16, 2019: <URL: http://blog.cmglocalsolutions.com/geo-precise-targeting-its-time-to-get-off-the-fence>, (May 15, 2015), 6 pgs.

(56) References Cited

OTHER PUBLICATIONS

Palmer, Alex, "Geofencing at events: how to reach potential customers live and on-site", Streetfight Mag, [Online] Retrieved form the Internet on May 16, 2019: <URL: http://streetfightmag.com/2015/08/20/geofencing-at-events-how-to-reach-potential-customers-live-and-on-site>, (Aug. 20, 2015), 6 pgs.
Peterson, Lisa, et al., "Location-Based Advertising", Peterson Mobility Solutions, (Dec. 2009), 39 pgs.
Rossignol, Joe, "How to screenshot Snapchat without sending notification", [Online] Retrieved from the Internet: <URL: https://www.idownloadblog.com/author/joerossignol/>, (May 3, 2014), 16 pgs.
Virgillito, Dan, "Facebook Introduces Mobile Geo-Fencing With Local Awareness Ads", Adespresso, [Online] Retrieved from the internet on May 16, 2019: <URL: https://adespresso.com/blog/facebook-local-business-ads-geo-fencing/>, (Oct. 8, 2014), 14 pgs.
Wagner, Kurt, "Snapchat Rolls Out Group-Sharing Feature for Concerts, Live Events", Mashable, [Online] Retrieved from the Internet on Sep. 12, 2019: <URL: https://mashable.com/2014/06/17/snapchat-our-story/?europe=true>, (Jun. 17, 2014), 16 pgs.
"U.S. Appl. No. 14/494,226, Appeal Decision dated Feb. 26, 2021", 8 pgs.
"U.S. Appl. No. 14/494,226, Notice of Allowance dated Jun. 9, 2021", 7 pgs.
"U.S. Appl. No. 14/494,226, Notice of Allowance dated Aug. 25, 2021", 5 pgs.
"U.S. Appl. No. 15/224,312, Final Office Action dated May 12, 2021", 21 pgs.
"U.S. Appl. No. 15/224,312, Response filed Apr. 9, 2021 to Non Final Office Action dated Nov. 9, 2020", 17 pgs.
"U.S. Appl. No. 15/224,343, Notice of Allowance dated Nov. 16, 2020", 7 pgs.
"U.S. Appl. No. 15/224,355, Notice of Allowance dated Jul. 13, 2021", 16 pgs.
"U.S. Appl. No. 15/224,365, Non Final Office Action dated Dec. 10, 2020", 16 pgs.
"U.S. Appl. No. 15/224,372, Notice of Allowance dated Jan. 12, 2021", 8 pgs.
"U.S. Appl. No. 15/224,377, Final Office Action dated Apr. 14, 2021", 14 pgs.
"U.S. Appl. No. 15/224,377, Response filed Mar. 30, 2021 to Non Final Office Action dated Oct. 30, 2020", 14 pgs.
"U.S. Appl. No. 15/947,350, Final Office Action dated Apr. 8, 2021", 13 pgs.
"U.S. Appl. No. 15/947,350, Response filed Mar. 1, 2021 to Non Final Office Action dated Sep. 28, 2020", 12 pgs.
"U.S. Appl. No. 16/000,657, 312 Amendment filed Apr. 30, 2021", 8 pgs.
"U.S. Appl. No. 16/000,657, Notice of Allowance dated Feb. 4, 2021", 8 pgs.
"U.S. Appl. No. 16/000,657, PTO Response to Rule 312 Communication dated May 11, 2021", 3 pgs.
"U.S. Appl. No. 16/529,461, Advisory Action dated Jan. 8, 2021", 4 pgs.
"U.S. Appl. No. 16/529,461, Non Final Office Action dated Feb. 22, 2021", 27 pgs.
"U.S. Appl. No. 16/529,461, Notice of Allowance dated Jun. 23, 2021", 9 pgs.
"U.S. Appl. No. 16/529,461, Response filed Apr. 29, 2021 to Non Final Office Action dated Feb. 22, 2021", 12 pgs.
"U.S. Appl. No. 16/529,461, Response filed Dec. 18, 2020 to Final Office Action dated Oct. 20, 2020", 10 pgs.
"U.S. Appl. No. 16/662,956, Final Office Action dated Mar. 29, 2021", 17 pgs.
"U.S. Appl. No. 16/662,956, Non Final Office Action dated Jul. 21, 2021", 12 pgs.
"U.S. Appl. No. 16/662,956, Response filed Jun. 24, 2021 to Final Office Action dated Mar. 29, 2021", 10 pgs.
"U.S. Appl. No. 16/662,956, Response filed Dec. 2, 2020 to Non Final Office Action dated Oct. 6, 2020", 11 pgs.
"U.S. Appl. No. 16/667,814, Corrected Notice of Allowability dated Mar. 2, 2021", 2 pgs.
"U.S. Appl. No. 16/667,814, Corrected Notice of Allowability dated Dec. 23, 2020", 2 pgs.
"U.S. Appl. No. 16/667,814, Non Final Office Action dated Aug. 17, 2020", 6 pgs.
"U.S. Appl. No. 16/667,814, Notice of Allowance dated Nov. 23, 2020", 8 pgs.
"U.S. Appl. No. 16/911,854, Non Final Office Action dated Mar. 3, 2021", 12 pgs.
"U.S. Appl. No. 16/911,854, Notice of Allowance dated Jun. 17, 2021", 8 pgs.
"U.S. Appl. No. 16/911,854, Response filed May 28, 2021 to Non Final Office Action dated Mar. 3, 2021", 8 pgs.
"U.S. Appl. No. 16/933,205, Non Final Office Action dated Apr. 16, 2021", 39 pgs.
"U.S. Appl. No. 16/933,279, Non Final Office Action dated Mar. 25, 2021", 41 pgs.
"U.S. Appl. No. 16/933,366, Non Final Office Action dated Apr. 27, 2021", 39 pgs.
"U.S. Appl. No. 17/023,175, Non Final Office Action dated Jun. 8, 2021", 8 pgs.
"Canadian Application Serial No. 3,027,981, Response filed Feb. 2, 2021 to Office Action dated Oct. 2, 2020", 15 pgs.
"Chinese Application Serial No. 201580070593.1, Office Action dated Oct. 23, 2020", w/ English Translation, 9 pgs.
"Chinese Application Serial No. 201580070593.1, Response filed Dec. 29, 2020 to Office Action dated Oct. 23, 2020", w/o English Claims, 11 pgs.
"European Application Serial No. 15870874.3, Communication Pursuant to Article 94(3) EPC dated Feb. 22, 2021", 5 pgs.
"Korean Application Serial No. 10-2020-7008140, Office Action dated Dec. 30, 2020", w/ English Translation, 7 pgs.
"Korean Application Serial No. 10-2020-7008140, Response filed Jan. 28, 2021 to Office Action dated Dec. 30, 2020", w/ English Claims, 16 pgs.
"Korean Application Serial No. 10-2021-7001942, Notice of Preliminary Rejection dated Apr. 20, 2021", w/ English translation, 11 pgs.
"Korean Application Serial No. 10-2021-7013085, Notice of Preliminary Rejection dated Jul. 30, 2021", 4 pgs.
U.S. Appl. No. 17/323,702, filed May 18, 2021, Ephemeral Gallery of Ephemeral Messages With Opt-In Permanence.
U.S. Appl. No. 17/234,012, filed Apr. 19, 2021, Apparatus and Method for Automated Privacy Protection in Distributed Images.
"U.S. Appl. No. 16/933,279, Response filed Aug. 25, 2021 to Non Final Office Action dated Mar. 25, 2021", 14 pgs.
"U.S. Appl. No. 16/933,366, Response filed Aug. 27, 2021 to Non Final Office Action dated Apr. 27, 2021", 16 pgs.
"U.S. Appl. No. 14/494,226, Corrected Notice of Allowability dated Sep. 28, 2021", 2 pgs.
"U.S. Appl. No. 15/224,355, Corrected Notice of Allowability dated Nov. 18, 2021", 3 pgs.
"U.S. Appl. No. 15/224,355, Notice of Allowability dated Jul. 21, 2021", 13 pgs.
"U.S. Appl. No. 15/224,355, Notice of Allowance dated Nov. 3, 2021", 10 pgs.
"U.S. Appl. No. 15/224,365, Appeal Brief filed Nov. 10, 2021", 15 pgs.
"U.S. Appl. No. 15/224,377, Corrected Notice of Allowability dated Oct. 26, 2021", 2 pgs.
"U.S. Appl. No. 15/224,377, Notice of Allowance dated Oct. 13, 2021", 14 pgs.
"U.S. Appl. No. 15/224,377, Response filed Sep. 14, 2021 to Final Office Action dated Apr. 14, 2021", 13 pgs.
"U.S. Appl. No. 16/529,461, Notice of Allowance dated Oct. 1, 2021", 8 pgs.
"U.S. Appl. No. 16/662,956, Final Office Action dated Oct. 27, 2021", 15 pgs.
"U.S. Appl. No. 16/662,956, Response filed Oct. 5, 2021 to Non Final Office Action dated Jul. 21, 2021", 10 pgs.
"U.S. Appl. No. 16/911,854, Corrected Notice of Allowability dated Sep. 16, 2021", 2 pgs.

(56) References Cited

OTHER PUBLICATIONS

"U.S. Appl. No. 16/911,854, Corrected Notice of Allowability dated Oct. 6, 2021", 2 pgs.
"U.S. Appl. No. 16/933,205, Final Office Action dated Nov. 29, 2021", 21 pgs.
"U.S. Appl. No. 16/933,205, Response filed Oct. 18, 2021 to Non Final Office Action dated Apr. 16, 2021", 13 pgs.
"U.S. Appl. No. 16/933,366, Final Office Action dated Oct. 21, 2021", 18 pgs.
"U.S. Appl. No. 17/023,175, Notice of Allowance dated Oct. 5, 2021", 7 pgs.
"U.S. Appl. No. 17/023,175, Response filed Sep. 8, 2021 to Non Final Office Action dated Jun. 8, 2021", 6 pgs.
"Korean Application Serial No. 10-2021-7001942, Notice of Preliminary Rejection dated Oct. 28, 2021", w/ English Translation, 11 pgs.
"Korean Application Serial No. 10-2021-7001942, Response filed Jun. 15, 2021 to Notice of Preliminary Rejection dated Apr. 20, 2021", w/ English Claims, 22 pgs.
"Korean Application Serial No. 10-2021-7013085, Response filed Sep. 30, 2021 to Notice of Preliminary Rejection dated Jul. 30, 2021", w/ English Claims, 17 pgs.
"U.S. Appl. No. 14/494,226, Corrected Notice of Allowability dated Dec. 6, 2021", 2 pgs.
"U.S. Appl. No. 15/947,350, Appeal Brief filed Dec. 8, 2021", 23 pgs.
U.S. Appl. No. 17/567,624, filed Jan. 3, 2022, User Interface to Augment an Image using Geolocation.
U.S. Appl. No. 17/567,397, filed Jan. 3, 2022, Multichannel System.
U.S. Appl. No. 17/647,511, filed Jan. 10, 2022, Routing Messages by Message Parameter.
"U.S. Appl. No. 15/224,312, Appeal Brief filed Feb. 14, 2022", 23 pgs.
"U.S. Appl. No. 15/224,355, Corrected Notice of Allowability dated Feb. 9, 2022", 3 pgs.
"U.S. Appl. No. 15/224,365, Examiner's Answer to Appeal Brief dated Dec. 15, 2021", 2 pgs.
"U.S. Appl. No. 15/224,377, 312 Amendment filed Jan. 7, 2022", 8 pgs.
"U.S. Appl. No. 15/224,377, Corrected Notice of Allowability dated Jan. 18, 2022", 2 pgs.
"U.S. Appl. No. 15/224,377, PTO Response to Rule 312 Communication dated Jan. 18, 2022", 1 pg.
"U.S. Appl. No. 15/947,350, Examiner's Answer dated Feb. 4, 2022", 8 pgs.
"U.S. Appl. No. 15/947,350, Examiner's Answer dated Feb. 8, 2022", 8 pgs.
"U.S. Appl. No. 16/662,956, Notice of Allowance dated Feb. 25, 2022", 12 pgs.
"U.S. Appl. No. 16/662,956, Response filed Jan. 25, 2022 to Final Office Action dated Oct. 27, 2021", 12 pgs.
"U.S. Appl. No. 17/023,175, Supplemental Notice of Allowability dated Jan. 20, 2022", 2 pgs.

GEO-LOCATION BASED EVENT GALLERY

CLAIM OF PRIORITY

This application is a continuation of and claims the benefit of priority of U.S. patent application Ser. No. 16/219,577, filed on Dec. 13, 2018, which is a continuation of and claims the benefit of priority of U.S. patent application Ser. No. 15/946,990, filed on Apr. 6, 2018, which is a continuation of and claims the benefit of priority of U.S. patent application Ser. No. 15/298,806, filed on Oct. 20, 2016, which is a continuation of and claims the benefit of priority of U.S. patent application Ser. No. 14/738,069, filed on Jun. 12, 2015, which is a continuation of and claims the benefit of priority of U.S. patent application Ser. No. 14/304,855, filed on Jun. 13, 2014, which applications are herein incorporated by reference in their entireties.

TECHNICAL FIELD

This invention relates generally to exchanging electronic messages in a computer network. More particularly, this invention relates to a geo-location based gallery of messages associated with an event.

BACKGROUND

Mobile devices, such as smartphones, are used to generate messages. The messages may be text messages, photographs (with or without augmenting text) and videos. Users can share such messages with individuals in their social network. However, there is no mechanism for sharing messages with strangers that are participating in a common event.

SUMMARY

A computer implemented method includes receiving a message and geo-location data for a device sending the message. It is determined whether the geo-location data corresponds to a geo-location fence associated with an event. The message is posted to an event gallery associated with the event when the geo-location data corresponds to the geo-location fence associated with the event. The event gallery is supplied in response to a request from a user.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION

Figure 1:
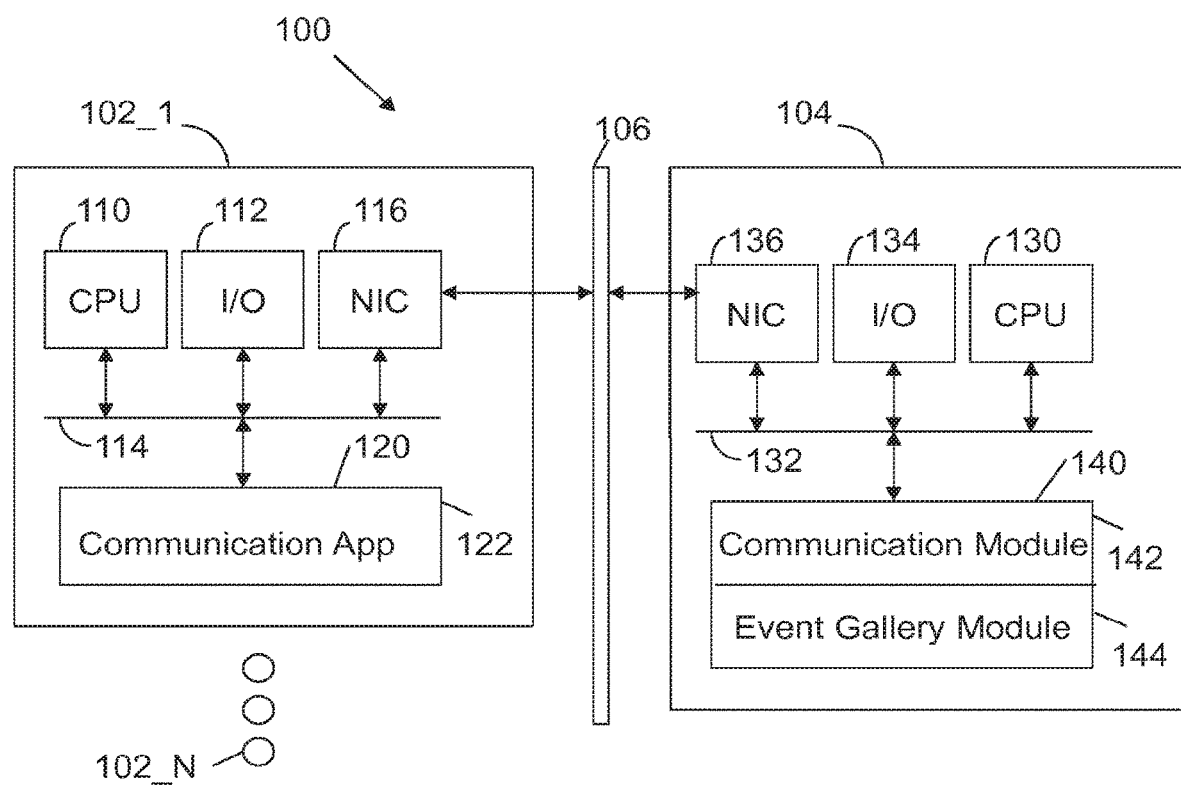
FIG. 1 illustrates a system configured in accordance with an embodiment of the invention.

Figure illustrates a system 100 configured in accordance with an embodiment of the invention. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a network 114. The input/output devices 112 may include a touch display, dedicated control buttons, physical connectors, speakers and the like. A network interface circuit 116 is also connected to the bus 114 and provides connectivity to network 106. A memory 120 is also connected to the bus 114. The memory 120 stores a communication application 122. The communication application 122 includes instructions executed by CPU 110 to coordinate communications with server 104 and/or other client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. The memory 140 stores a communication module 142. The communication module 142 includes instructions executed by the CPU 130 to coordinate communications with client devices 102. The memory 140 also stores an event gallery module 144. The event gallery module 144 includes instructions executed by the CPU 130 to store messages from participants in a live event. The messages form an event gallery, which may be supplied to a client device 102 in response to a request from a client device 102.

Figure 2:
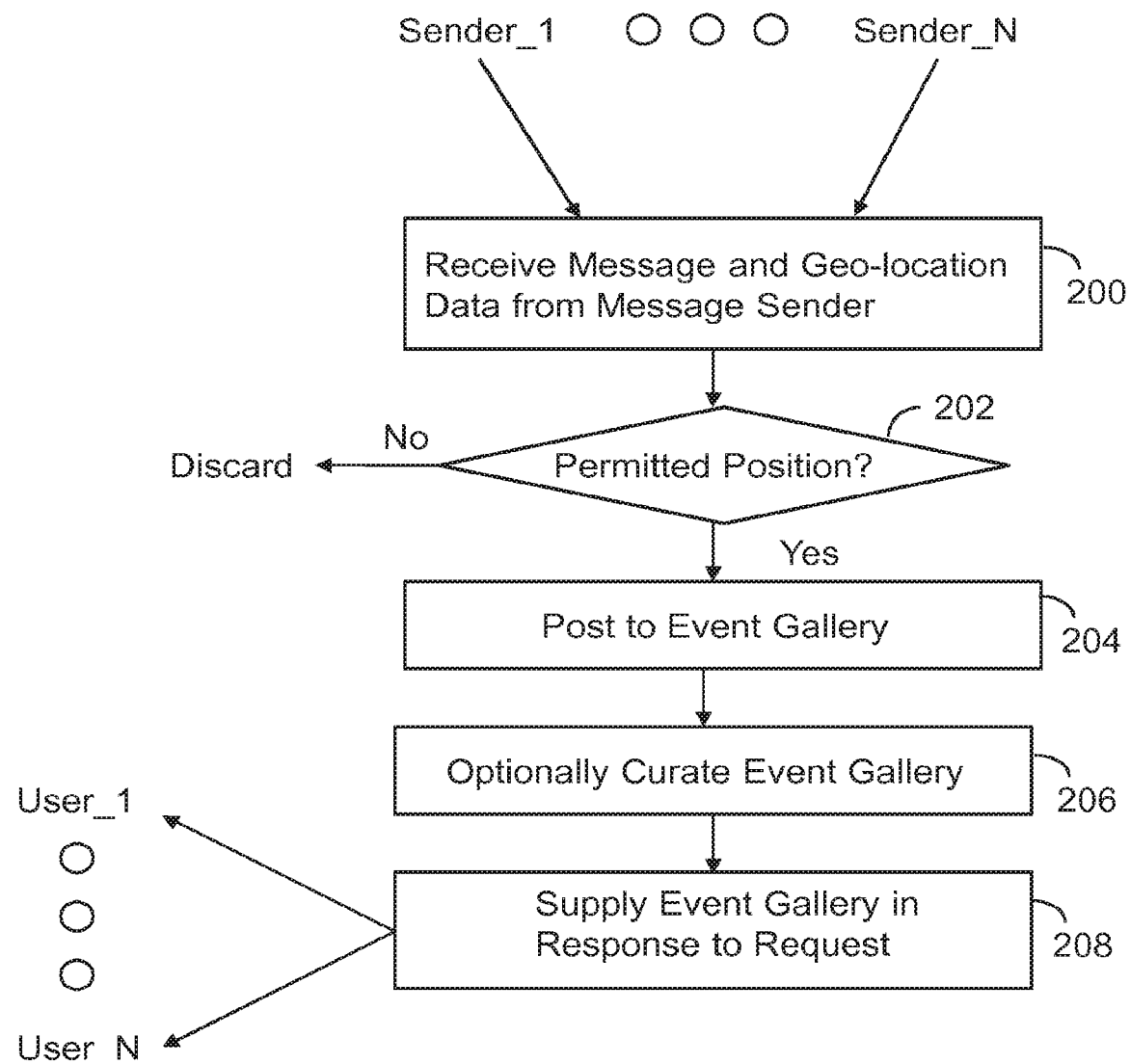
FIG. 2 illustrates server side processing associated with an embodiment of the invention.

FIG. 2 illustrates operations associated with an embodiment of the event gallery module 144. The top of the figure illustrates a set of message senders, i.e., Sender_1 through Sender_N. Each message sender is associated with a client device 102. The communication application 122 is configured to accompany a message with geo-location information. Typically, the geo-location information will be collected from a GPS chip resident in the client device. However, other geo-location information may also be used, such as cellular network geo-location information, self-reported geo-location information and the like.

The event gallery module 144 includes an administrative interface that allows one to define an event. For example, the administrative interface may prompt an event planner for event name, event description, event date, event time and event location. The event location is specified in physical coordinates (e.g., GPS coordinates) that define a geo-location fence associated with the event.

As previously indicated, messages from senders include geo-location information. The server 104 receives such messages and geo-location data 200 from any number of senders. For each message, the geo-location data is compared to the geo-location fence. If the message was not sent from within the geo-location fence it is not from a permitted position and it is therefore discarded (202—No). If the message is from a permitted position (202—Yes), the message is posted to an event gallery 204.

The event gallery module 144 may include a curation interface that allows an event planner to optionally curate the event gallery 206. For example, the curation interface may allow the event planner to delete inappropriate or redundant messages. The final operation of FIG. 2 is to supply the event gallery in response to requests 208 from any number of users.

Figure 3:
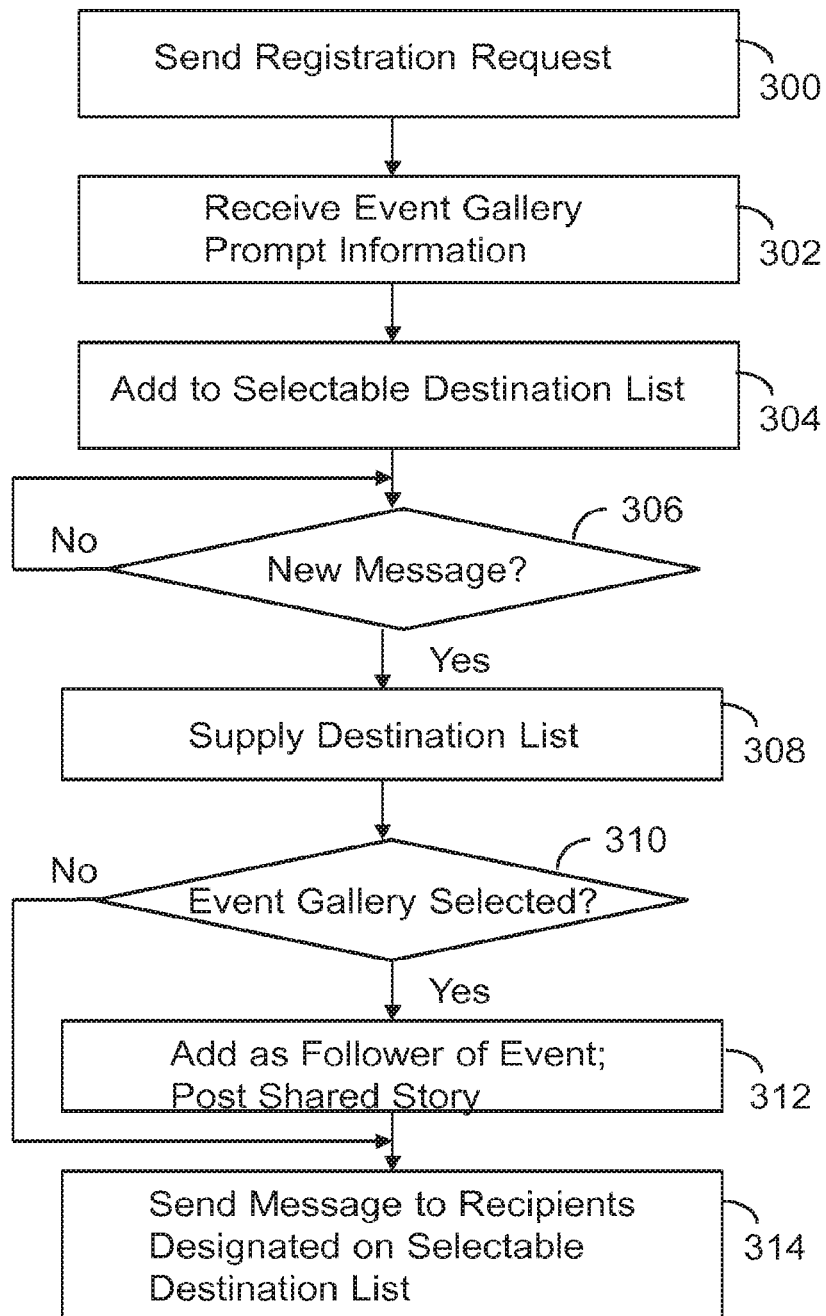
FIG. 3 illustrates client side processing associated with an embodiment of the invention.

FIG. 3 illustrates processing associated with the communication application 122 resident on a client device 102. The communication application 122 sends a registration request 300. The registration request may be an explicit request to join or follow an event. Alternately, the registration request may be triggered by sending geo-location data to server 104. The event gallery module 144 determines whether the geo-location data corresponds to a geo-location fence associated with an event. Event gallery prompt information is received 302 in response to a request. The event gallery prompt information may be indicia of the event, such as a brand, a textual description and the like. The event gallery prompt information is added to a selectable destination list 304. The selectable destination list 304 includes individuals in a user's social network. In this case, the selectable destination list is augmented with indicia of an event.

If a user generates a message (306—Yes) the destination list is supplied 308. The destination list includes individuals in a user's social network and indicia of the event and/or event gallery. If the event gallery is selected (310), the user is added as a follower of the event 312. So, for example, in the case where the user received the event gallery prompt in response to simply communicating geo-location data, the user may formally follow the event by posting a message (shared story) to the event gallery. That is, the event gallery module 144 adds the user to a list of event followers in response to the user posting a message to the event gallery. Finally, messages are sent to recipients designated on the selectable destination list 314. These recipients are typically individuals in the user's social network.

Figure 4:
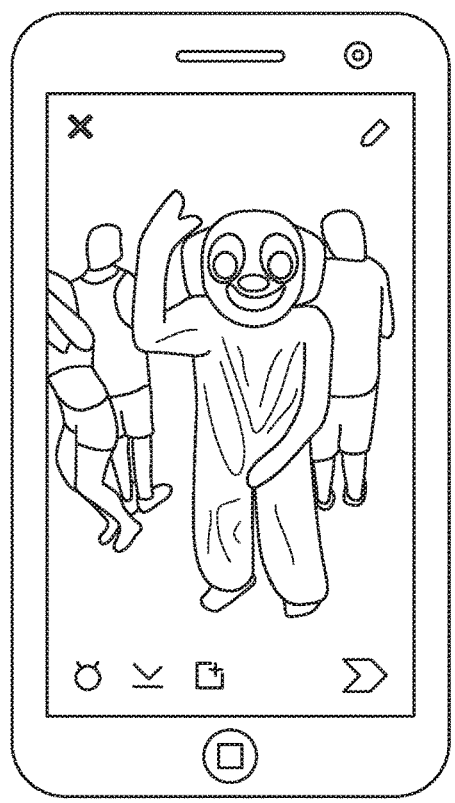
FIGS. 4-8 illustrate graphical user interfaces that may be associated with embodiments of the invention.
Figure 5:
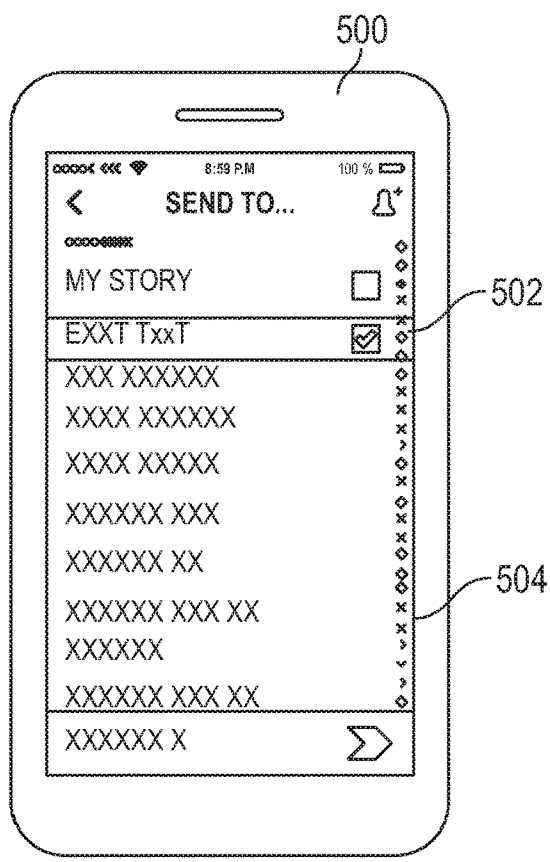
Figure 6:
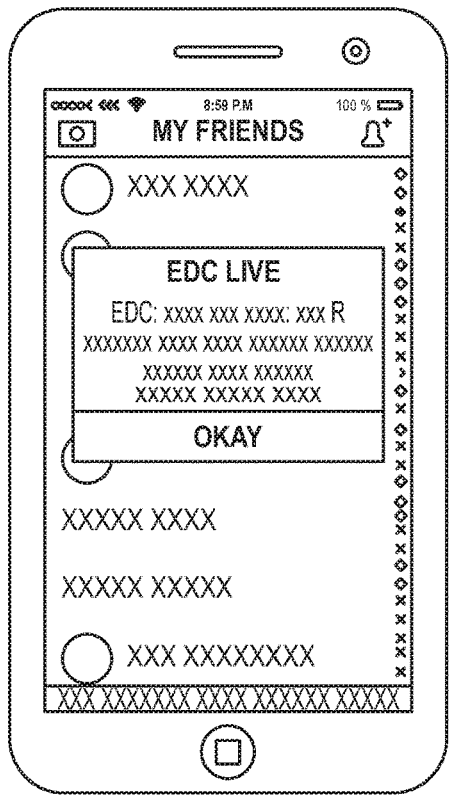
Figure 7:
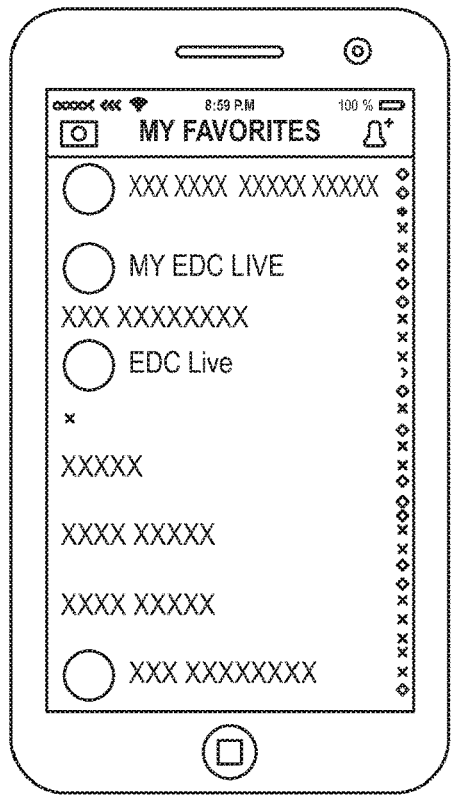

FIG. 4 is an example of a message taken at an event. In this example, the message is a photograph, which may be augmented with text. FIG. 5 illustrates a selectable destination list 500. The selectable destination list 500 includes an entry for a live event 502 and entries 504 for individuals in a social network. Selecting the live event 502 from the selectable destination list 500 may result in a prompt as shown in FIG. 6. The prompt may explain terms associated with posting content to the event gallery. FIG. 7 illustrates an interface listing friends in a social network and one or more events that are being followed.

Figure 8:
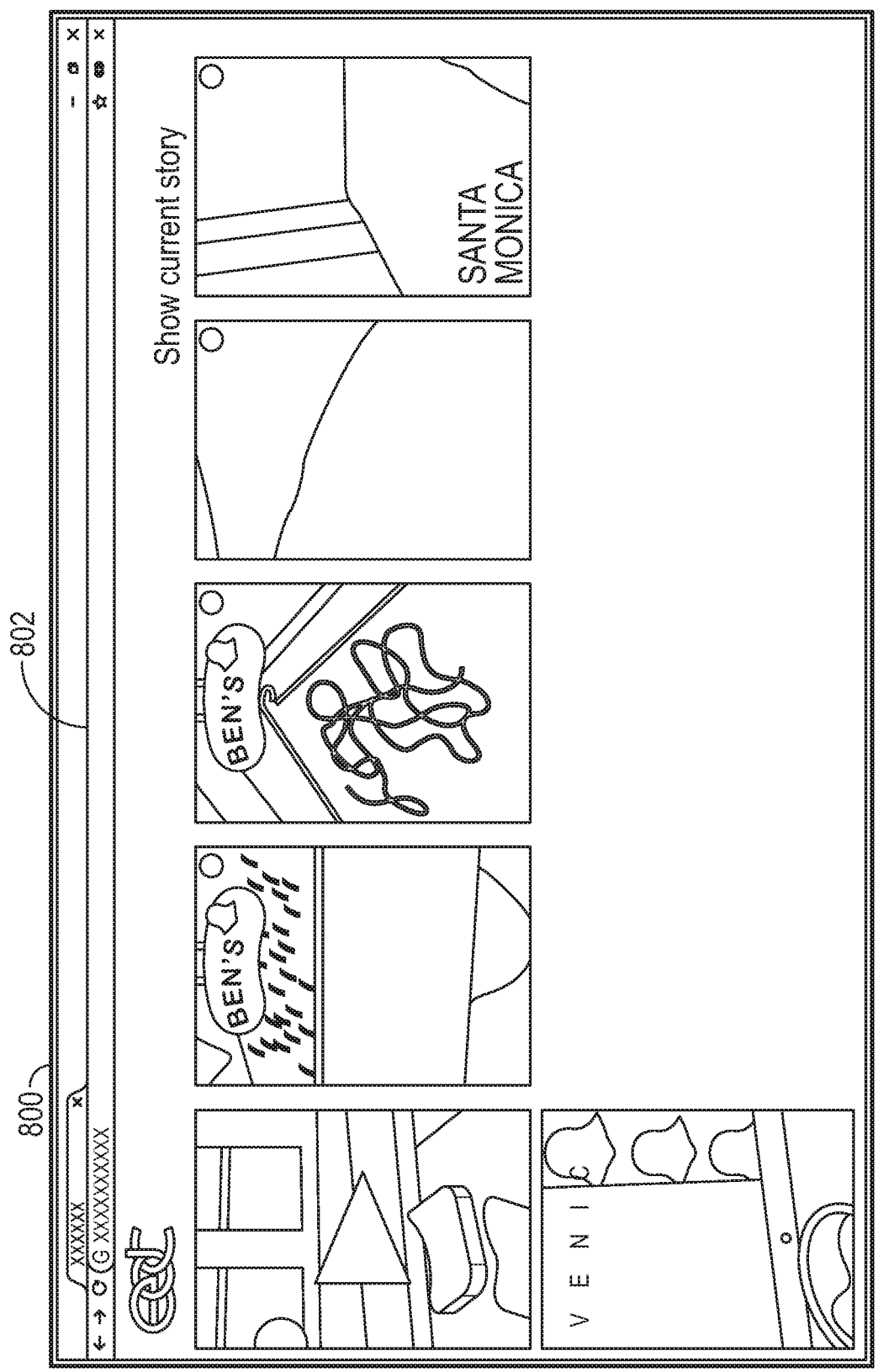

FIG. 8 is an example of an event gallery 800. The event gallery 800 includes individual posted messages 802. The messages may be photographs, videos or text messages. The event gallery may be available for a specified transitory period. For example, the specified transitory period may be the duration of an event. Indicia of the event gallery may appear in a list of friends (e.g., destination list) for the duration of the event. In one embodiment, the event gallery has individual ephemeral messages shown in a sequence. For example, a first image is shown for five seconds, then a second image is shown for three seconds, etc.

An event gallery may be open to all event participants. Alternately, an event gallery may be formed for a subset of participants selected from a destination list or some other list (e.g., a list of co-workers at an event). An embodiment of the invention maintains an ongoing event gallery (shared story) for a geo-location. For example, the shared story may extend over months. Alternately, the shared story may be renewed every twenty-four hour period at a specified geo-location.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method comprising:
   receiving, by a server computer, geolocation data from a computing device;
   determining, by the server computer, that the geolocation data corresponds to a geo-fence associated with a plurality of galleries;
   providing, by the server computer, user-selectable gallery information comprising indicia for each of the plurality of galleries corresponding to the geo-fence, to the computing device in response to receiving the geolocation data from the computing device;
   receiving, by the server computer, a first message comprising a photograph as the background for the message in response to a second message in a first gallery of the plurality of galleries; and
   adding, by the server computer, the first message to the first gallery associated with a selection of the indicia for the first gallery in the plurality of galleries of the of user-selectable gallery information;
   wherein the first message is accessible by other computing devices accessing the gallery information to view the first message comprising the photograph as the background of the first message.

2. The method of claim 1, wherein the user-selectable gallery information is added to a selectable list of galleries.

3. The method of claim 1, wherein before the first message is added to the gallery associated with the selection of the indicia for the first gallery in the plurality of galleries of the of the user-selectable gallery information, the first message is curated to delete inappropriate messages.

4. The method of claim 1, wherein the method further comprises:
   receiving a third message from the computing device; and
   sending the third message to a specified individual.

5. The method of claim 1, wherein the user-selectable gallery information is provided based on the geolocation associated with the computing device.

6. The method of claim 1, wherein the computing device is a first computing device and wherein the first message is accessible by a second computing device based on geolocation data of the second computing device corresponding to a geo-fence corresponding to the first gallery.

7. The method of claim 1, wherein the first message is an ephemeral message.

8. A server computer comprising:
   a processor; and
   a memory storing instructions that, when executed by the processor, configure the server computer to perform operations comprising:
   receiving geolocation data from a computing device;
   determining that the geolocation data corresponds to a geo-fence associated with a plurality of galleries;
   providing user-selectable gallery information comprising indicia for each of the plurality of galleries corresponding to the geo-fence, to the computing device in response to receiving the geolocation data from the computing device;
   receiving a first message comprising a photograph as the background for the message in response to a second message in a first gallery of the plurality of galleries; and
   adding the first message to the first gallery associated with a selection of the indicia for the first gallery in the plurality of galleries of the of user-selectable gallery information;
   wherein the first message is accessible by other computing devices accessing the gallery information to view the first message comprising the photograph as the background of the first message.

9. The server computer of claim 8, wherein the user-selectable gallery information is added to a selectable list of galleries.

10. The server computer of claim 8, wherein before the first message is added to the gallery associated with the selection of the indicia for the first gallery in the plurality of galleries of the of the user-selectable gallery information, the first message is curated to delete inappropriate messages.

11. The server computer of claim 8, wherein the method further comprises:
    receiving a third message from the computing device; and
    sending the third message to a specified individual.

12. The server computer of claim 8, wherein the user-selectable gallery information is provided based on the geolocation associated with the computing device.

13. The server computer of claim 8, wherein the computing device is a first computing device and wherein the first message is accessible by a second computing device based on geolocation data of the second computing device corresponding to a geo-fence corresponding to the first gallery.

14. The server computer of claim 8, wherein the first message is an ephemeral message.

15. A non-transitory computer readable storage medium having instructions for causing a computer to perform operations comprising:
    receiving geolocation data from a computing device;
    determining that the geolocation data corresponds to a geo-fence associated with a plurality of galleries;
    providing user-selectable gallery information comprising indicia for each of the plurality of galleries corresponding to the geo-fence, to the computing device in response to receiving the geolocation data from the computing device;
    receiving a first message comprising a photograph as the background for the message in response to a second message in a first gallery of the plurality of galleries; and
    adding the first message to the first gallery associated with a selection of the indicia for the first gallery in the plurality of galleries of the of user-selectable gallery information;
    wherein the first message is accessible by other computing devices accessing the gallery information to view the first message comprising the photograph as the background of the first message.

16. The non-transitory computer readable storage medium of claim 15, wherein the user-selectable gallery information is added to a selectable list of galleries.

17. The non-transitory computer readable storage medium of claim 15, wherein before the first message is added to the gallery associated with the selection of the indicia for the first gallery in the plurality of galleries of the of the user-selectable gallery information, the first message is curated to delete inappropriate messages.

18. The non-transitory computer readable storage medium of claim 15, wherein the method further comprises:
    receiving a third message from the computing device; and
    sending the third message to a specified individual.

19. The non-transitory computer readable storage medium of claim 15, wherein the user-selectable gallery information is provided based on the geolocation associated with the computing device.

20. The non-transitory computer readable storage medium of claim 15, wherein the computing device is a first computing device and wherein the first message is accessible by a second computing device based on geolocation data of the second computing device corresponding to a geo-fence corresponding to the first gallery.

* * * * *